(12) United States Patent
Kitamura et al.

(10) Patent No.: US 8,805,086 B2
(45) Date of Patent: Aug. 12, 2014

(54) IMAGE PROCESSING APPARATUS, IMAGE PROCESSING METHOD AND COMPUTER-READABLE RECORDING DEVICE

(75) Inventors: Makoto Kitamura, Hachioji (JP); Yamato Kanda, Hino (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 229 days.

(21) Appl. No.: 13/315,347

(22) Filed: Dec. 9, 2011

(65) Prior Publication Data

US 2012/0148153 A1 Jun. 14, 2012

(30) Foreign Application Priority Data

Dec. 10, 2010 (JP) ................................ 2010-276289

(51) Int. Cl.
*G06K 9/48* (2006.01)
(52) U.S. Cl.
USPC ........................................................ 382/199
(58) Field of Classification Search
USPC ............... 382/103, 128, 134, 165, 199, 203; 600/160
See application file for complete search history.

(56) References Cited

U.S. PATENT DOCUMENTS

2009/0148014 A1 6/2009 Kanda

FOREIGN PATENT DOCUMENTS

JP 2007-313119 12/2007

OTHER PUBLICATIONS

European Search Report dated Apr. 17, 2012 from corresponding European Patent Application No. EP 11 00 9685.6.
Jähne, B., "Digitale Bildverarbeitung", Jan. 1, 1993, Springer, Berlin, p. 158.
Cheng, D., et al., "Temple-Based Bubble Identification and Tracking in Image Sequences", International Journal of Thermal Sciences (2006), vol. 45, No. 3, pp. 321-330.
Robinson, G.S., "Edge Detection by Compass Gradient Masks", Computer Graphics and Image Processing (1977) vol. 6, No. 5, pp. 492-501.
Jun, Z., et al., "Method for Detecting Elliptical Pattern Using Director Circle", Singapore ICCS/ISITA '92, 'Communications on the Move', Singapore Nov. 16-20, 1992, pp. 539-543.
Qiao, Y, et al., "Connectivity-Based Multiple-Circle Fitting", Pattern Recognition (2004), vol. 37, No. 4, pp. 755-765.

*Primary Examiner* — Duy M Dang
(74) *Attorney, Agent, or Firm* — Scully, Scott, Murphy & Presser, P.C.

(57) ABSTRACT

An image processing apparatus to detect a bubble region included in image includes: a bubble candidate region setting unit which sets, from the image, a region as a bubble candidate region, the region having shape corresponding to a bubble region shape model stored in a storage unit; and a bubble region determination unit which determines, on the basis of information belonging to the bubble candidate region, whether the bubble candidate region is a bubble region.

24 Claims, 19 Drawing Sheets

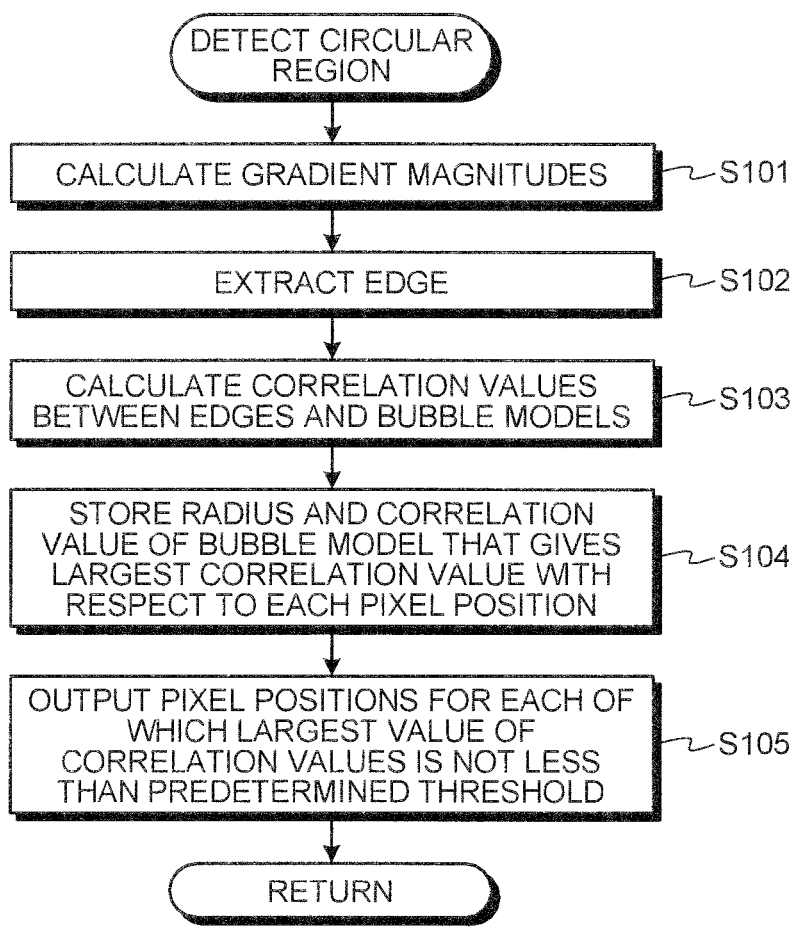

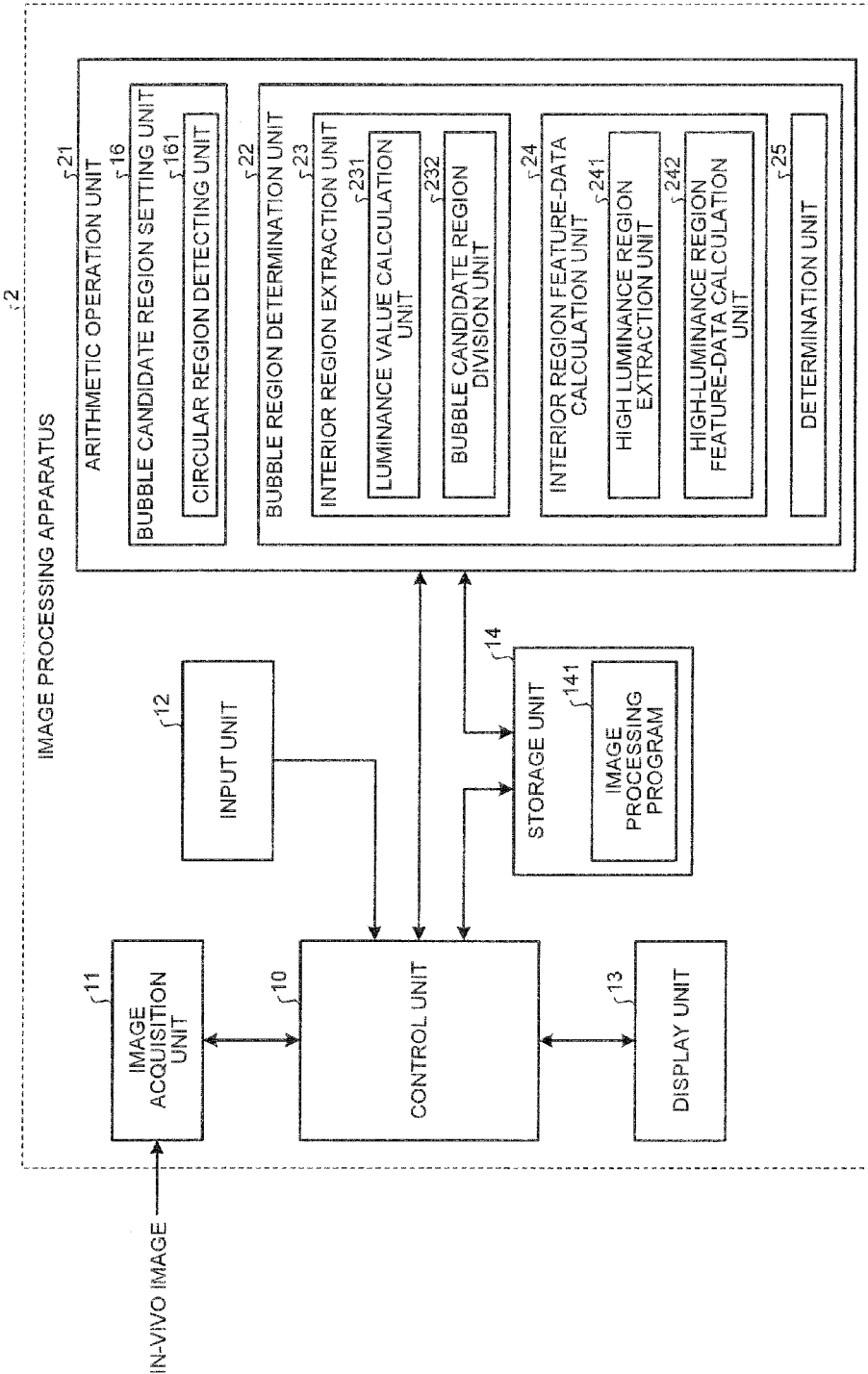

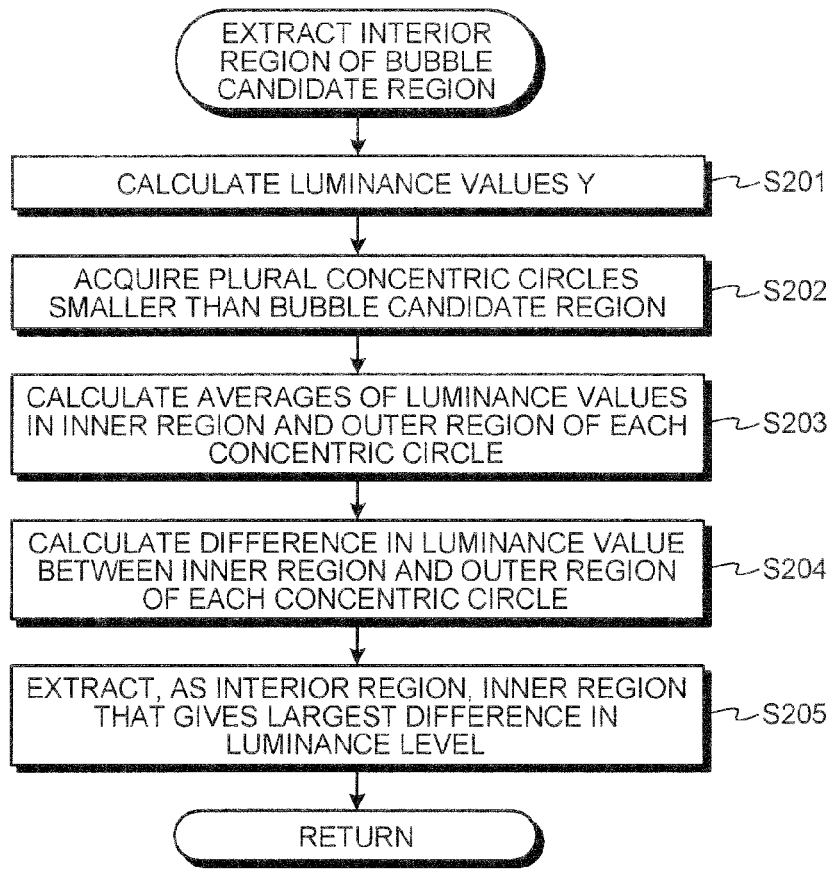
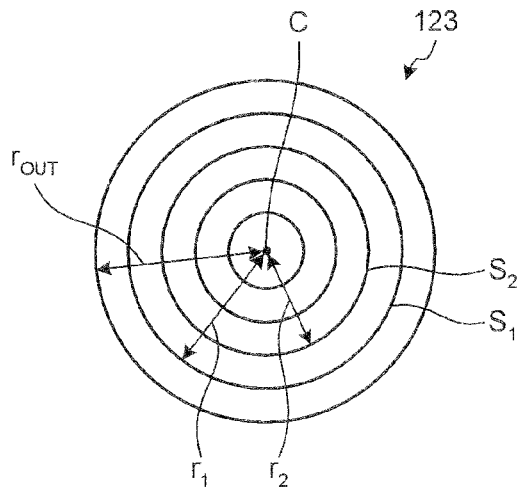

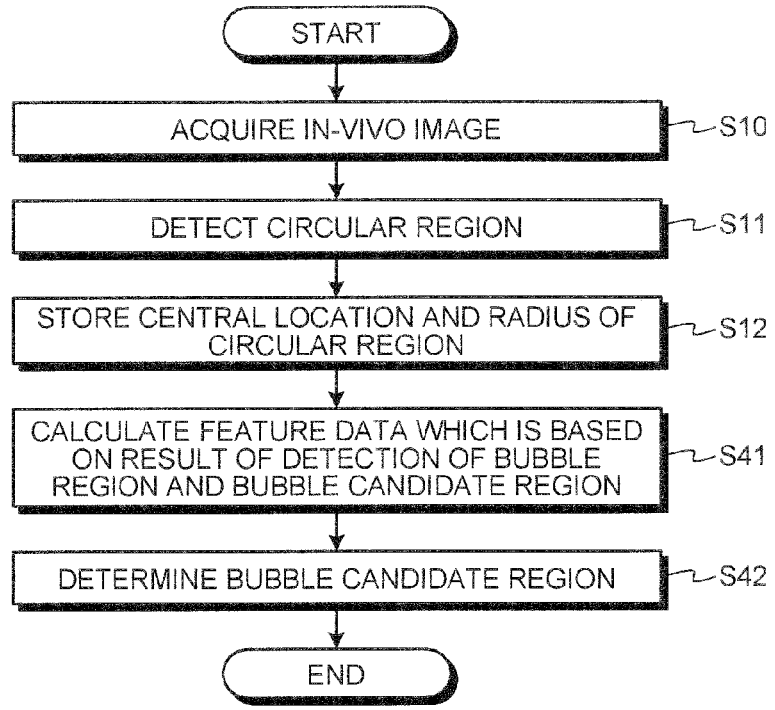
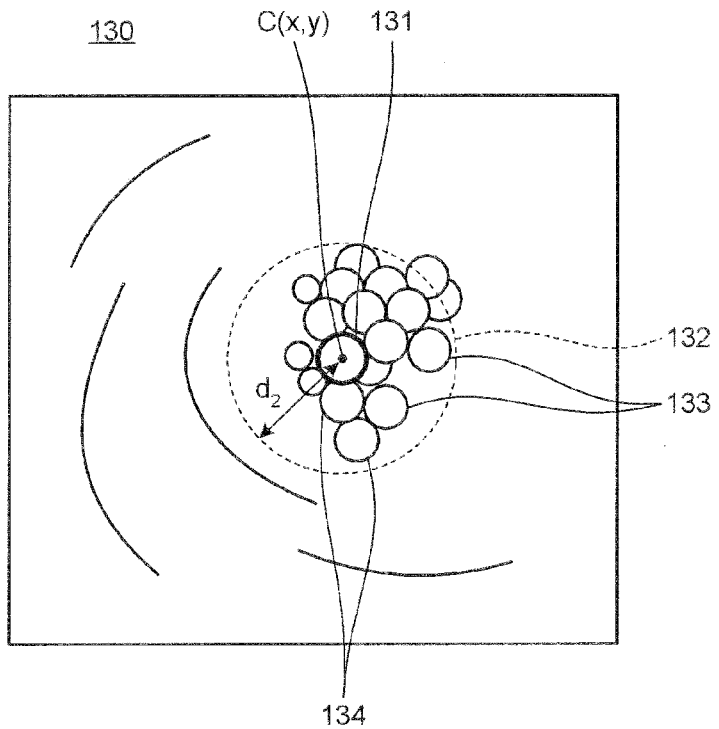

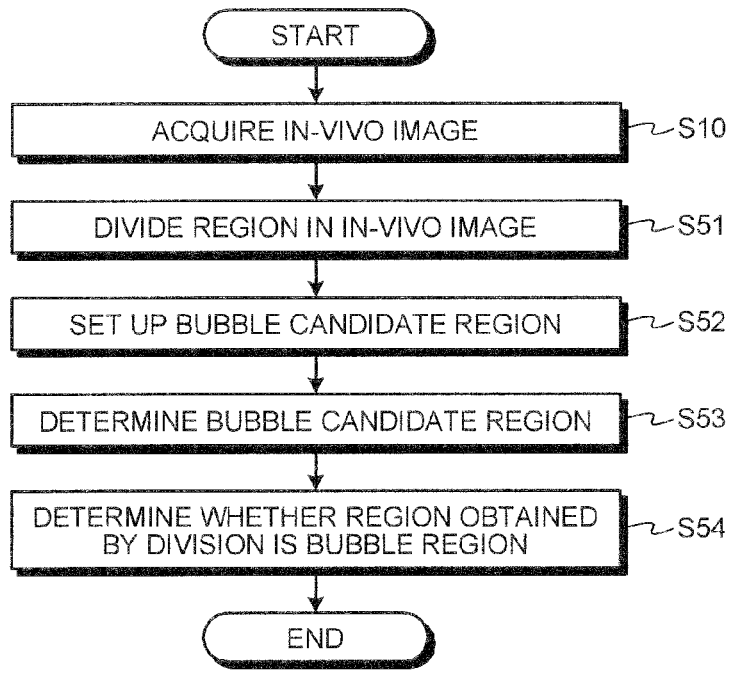
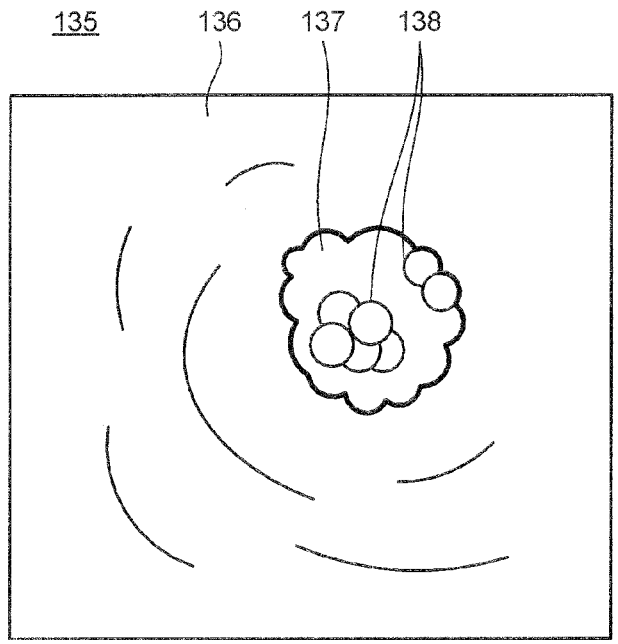

IMAGE PROCESSING APPARATUS, IMAGE PROCESSING METHOD AND COMPUTER-READABLE RECORDING DEVICE

CROSS-REFERENCE TO RELATED APPLICATIONS

This application is based upon and claims the benefit of priority from Japanese Patent Application No. 2010-276289, filed on Dec. 10, 2010, the entire contents of which are incorporated herein by reference.

BACKGROUND OF THE INVENTION

1. Field of the Invention

The present invention relates to an image processing apparatus, an image processing method and an image processing program to detect, from an image, a region onto which a bubble has been imaged.

2. Description of the Related Art

Conventionally, endoscopes are widely used as medical observation devices, which are introduced into the body of examinees such as patients and through which the insides of living organisms are non-invasively observed. In recent years, even an endoscope (capsule endoscope) to be swallowed has been developed, which has a capsule-shaped casing to accommodate an imaging device, a communication device and the like, and wirelessly transmits image data captured by the imaging device to the outside of the body. The number of images (in-vivo images) obtained in series by imaging the interior of a lumen by use of such a medical observation device is enormous (not less than tens of thousands), and observing and diagnosing each in-vivo image requires abundant experience. Therefore, a medical diagnosis support capability to assist a doctor in diagnosis is desirable.

As one image recognition technology that implements such a capability, a technology for automatically detecting and removing from images any regions not requiring to be observed in a medical diagnosis has been proposed. Here, the regions not requiring to be observed are regions other than a mucous membrane, which is a biological tissue, and include, for example, a region (hereinafter, referred to as "bubble region") onto which an air bubble (hereinafter, referred to simply as "bubble") generated in the interior of a lumen has been imaged. For example, Japanese Laid-open Patent Publication No. 2007-313119 discloses a method for calculating correlation values between gradient magnitudes of pixels and bubble models having been preset on the basis of features of bubble images, and detecting as a bubble region a region that gives the correlation value of a predetermined threshold or more.

SUMMARY OF THE INVENTION

An image processing apparatus according to an aspect of the present invention to detect a bubble region included in image includes: a bubble candidate region setting unit which sets, from the image, a region as a bubble candidate region, the region having shape corresponding to a bubble region shape model stored in a storage unit; and a bubble region determination unit which determines, on the basis of information belonging to the bubble candidate region, whether the bubble candidate region is a bubble region.

An image processing method according to another aspect of the present invention for detecting a bubble region in an image includes: a bubble candidate region setting in which, from the image, a region having a shape corresponding to a bubble region shape model stored in memory means is set as a bubble candidate region by bubble candidate region setting means; and a bubble candidate region determining in which whether the bubble candidate region is a bubble region is determined by bubble region determination means on the basis of information belonging to the bubble candidate region.

A computer-readable recording device according to still another aspect of the present invention with an executable program stored thereon, wherein the program instructs a processor to perform: a bubble candidate region setting in which, from the image, a region having a shape corresponding to a bubble region shape model stored in memory means is set as a bubble candidate region by bubble candidate region setting means; and a bubble candidate region determining in which whether the bubble candidate region is a bubble region is determined by bubble region determination means on the basis of information belonging to the bubble candidate region.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart illustrating operation of a circular region detection unit illustrated in FIG. 1;

FIG. 7 is a block diagram illustrating the configuration of an image processing apparatus according to a second embodiment of the present invention;

FIG. 8 is a flowchart illustrating operation of an interior region extraction unit illustrated in FIG. 7;

FIG. 9 is a view illustrating a method for extracting an interior region inside a bubble candidate region;

FIG. 23 is a flowchart illustrating operation of the image processing apparatus illustrated in FIG. 22;

FIG. 24 is a view illustrating a method, used in the image processing apparatus illustrated in FIG. 22, for determining a bubble region;

FIG. 26 is a flowchart illustrating operation of the image processing apparatus illustrated in FIG. 25; and FIG. 27 is a view illustrating a method, used in the image processing apparatus illustrated in FIG. 25, for determining a bubble region.

DETAILED DESCRIPTION OF THE PREFERRED EMBODIMENTS

Figure 1:
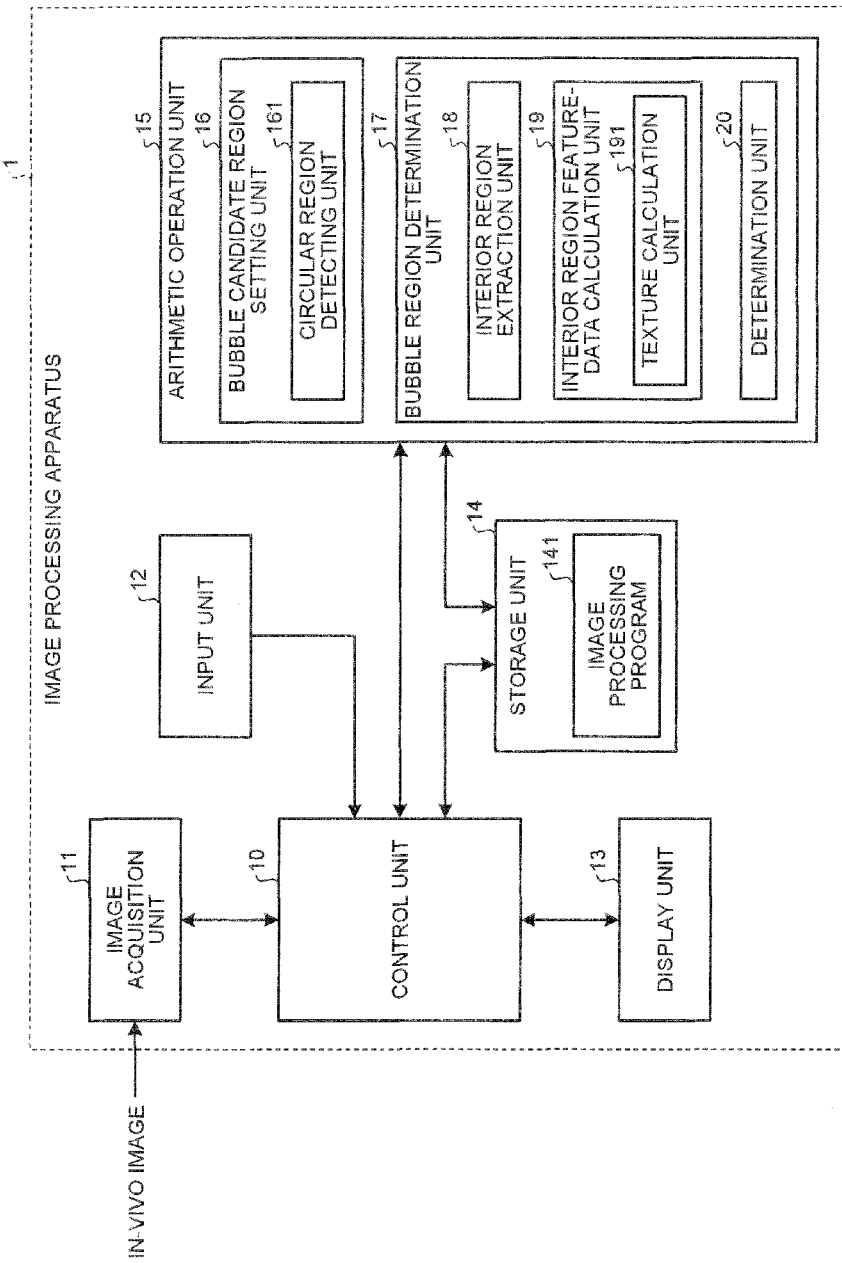
FIG. 1 is a block diagram illustrating the configuration of an image processing apparatus according to a first embodiment of the present invention.

Embodiments of the present invention are described below with reference to the drawings. Note that the present invention is not limited by these embodiments. Additionally, the same parts are illustrated with the same reference numerals attached thereto in describing the drawings.

An image processing apparatus according to each of the embodiments described below is configured to process images captured by a medical observation device such as an endoscope or a capsule endoscope. Specifically, the image processing apparatus detects, from an image obtained by imaging the inside of a living organism (lumen) of an examinee, a bubble region onto which a bubble is imaged. In the following description, an in-vivo image to which the image processing is applied is, for example, a color image having pixel levels (pixel values) corresponding to 256 gradations with respect to each of color components R (red), G (green) and B (blue) in each pixel. Note that, although the image processing performed on an in-vivo image is described as one example in the following embodiments, the image processing apparatus according to the present invention may be applied also to cases where bubble regions are detected from images in general.

Additionally, a bubble region to be detected in the following embodiments usually has, with the surface tension acting thereon, an appearance in a plan view which has any one of shapes similar to a circle such as a circular, oblate and oval shapes, or any one of shapes (arcs and the like) formed of parts of the circumferences of such shapes. Therefore, the preset application assumes that shapes simply referred to as "circular shapes" include not only a perfect circle but also oblate and oval shapes, and those simply referred to as "arcs" include shapes formed of parts of the circumferences of a perfect circle and shapes similar to circles.

First Embodiment

FIG. 1 is a block diagram illustrating the configuration of an image processing apparatus according to a first embodiment of the present invention. As illustrated in FIG. 1, an image processing apparatus 1 comprises: a control unit 10 to control operation of the entirety of the image processing apparatus 1; an image acquisition unit 11; an input unit 12; a display unit 13; a storage unit 14; and an arithmetic operation unit 15.

The image acquisition unit 11 acquires image data of an in-vivo image captured by a medical observation device. The image acquisition unit 11 is appropriately configured in accordance with the mode of a system which comprises the medical observation device. For example, in a case where the medical observation device is a capsule endoscope, and a portable recording medium is used for transfer of image data from and to the medical observation device, the image acquisition unit 11 is composed of a reader apparatus on which this recording medium is attachably and detachably mounted, and which is configured to read out image data of stored in-vivo images. Additionally, in a case where a server in which to store image data of in-vivo images captured by the medical observation device is installed, the image acquisition unit 11 is composed of a communication device or the like connected to the server, and performs data communication with the server to acquire the image data of in-vivo images. Alternatively, the image acquisition unit 11 may be composed of an interface device or the like through which image signals are inputted from the medical observation device, such as an endoscope, via a cable.

The input unit 12 is, for example, implemented by a keyboard and mouse, a touch panel or various switches, and outputs input signals to the control unit 10.

The display unit 13 is implemented by a display device such as an LCD or an EL display, and displays various screens containing in-vivo images under the control of the control unit 10.

The storage unit 14 is implemented by an information recording medium and a reader for the medium, examples of the information recording medium including: various IC memories such as ROM, rewritable flash memory such as RAM; a hard disk that is built-in or connected via a data communication terminal; and a CD-ROM. The storage unit 14 stores therein, as well as image data of in-vivo images acquired by the image acquisition unit 11, a program used for causing the image processing apparatus 1 to operate and causing the image processing apparatus 1 to execute various functions, data to be used during execution of this program, and the like. Specifically, the storage unit 14 stores therein an image processing program 141 used for detecting a bubble region in an in-vivo image.

The arithmetic operation unit 15 is implemented by hardware such as a CPU, and reads the image processing program 141 to process image data of in-vivo images, and perform various kinds of arithmetic operations for detecting a bubble region from an in-vivo image.

The control unit 10 is implemented by hardware such as a CPU, and performs overall control over the operation of the entirety of the image processing apparatus 1 in such a manner as to read various programs stored in the storage unit 14, and thereby provide instructions to and transfer data to each unit composing the image processing apparatus 1 in accordance with image data inputted from the image acquisition unit 11, actuating signals inputted from the input unit 12, and the like.

Figure 2:
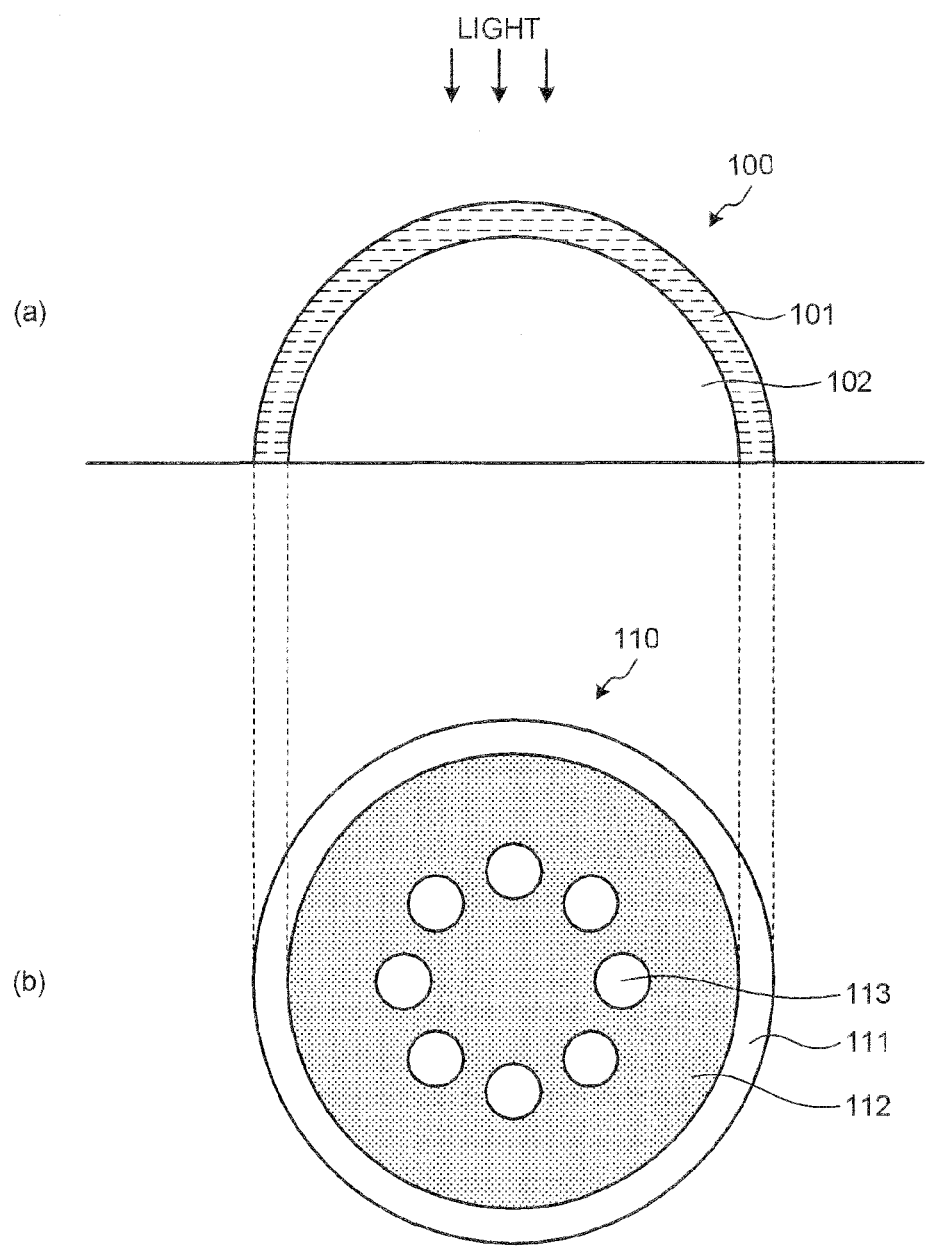
FIG. 2 is a view illustrating the structure of a bubble region.

Here, a bubble region to be detected in the image processing performed by the arithmetic operation unit 15 is described. FIG. 2 is a view illustrating an example of the structure of a bubble region. As illustrated in part (a) of FIG. 2, a bubble 100 is an object formed of liquid (such as water) containing gas such as air and having been rounded by the surface tension acting thereon, and is composed of a film 101 such as water, and gas 102 that exists inside the film 101. When the bubble 100 as described above is imaged while being irradiated with light, an image of a bubble region 110 as illustrated in the part (b) of FIG. 2 is obtained. This bubble region 110 has a circular or arc-like external shape, and, as an internal structure, includes: a boundary region 111 corresponding to a thickness portion of the film 101 and included in the periphery of the bubble region 110; an interior region 112 located to the inner side thereof; and high luminance regions 113 found in plural locations in the inside of the interior region 112. In this structure, the boundary region 111 is a bright region generated as a result of scattering of the irradiation light in the film 101. On the other hand, the interior region 112 is a region generated as a result of transmission of the most of the irradiation light through the film 101, and is a dark region as a whole. Each of the high luminance regions 113 is a region, having a high luminance value, where a halation has occurred by the glare of a light source due to the mirror reflection of the irradiation light on the surface of the film 101.

Next, the detailed configuration of the arithmetic operation unit 15 is described. The arithmetic operation unit 15 comprises: a bubble candidate region setting unit 16 which detects, from an in-vivo image, a region having a shape that corresponds to a bubble region shape model (bubble model) previously stored in the storage unit 14, and sets this region as a bubble candidate region; and a bubble region determination unit 17 which determines, on the basis of information belonging to a bubble candidate region, whether the bubble candidate region is a bubble region.

The bubble candidate region setting unit 16 has a circular region detecting unit 161. The circular region detecting unit 161 compares with a bubble model edges extracted from an in-vivo image, and extracts an edge region that has a high correlation with the bubble model, thereby detecting a region that has a circular or arc-like shape.

The bubble region determination unit 17 includes an interior region extraction unit 18, an interior region feature-data calculation unit 19 and a determination unit 20.

The interior region extraction unit 18 extracts a predetermined region in the bubble candidate region as the interior region 112.

The interior region feature-data calculation unit 19 calculates feature data of the interior region 112. More specifically, the interior region feature-data calculation unit 19 has a texture calculation unit 191 which calculates, as feature data that represents the texture of the interior region 112, a variance of the pixel values (e.g., luminance values) in the interior region 112 (reference: CG-ARTS Society, "Digital Image Processing", p. 71).

The determination unit 20 determines, on the basis of the feature data (the variance of the pixel values) that represents the texture of the interior region 112, whether the bubble candidate region is a bubble region. Here, as described above, the interior region 112 is a dark region through which the irradiation light has transmitted. However, since the high luminance regions 113 exist in the inside thereof, the width of the luminance of the whole inside of the interior region 112 tends to be large as compared to the other regions of an in-vivo image 120. Thus, comparison of the variance of the pixel values in the interior region 112 with a predetermined threshold makes it possible to determine whether the candidate bubble region is a bubble region or a region other than bubble regions (such as an organic mucous membrane region). Specifically, when the variance of the pixel values is not less than the predetermined threshold, the determination unit 20 determines the bubble candidate region to be a bubble region, whereas, when the variance of the pixel values is less than the predetermined threshold, the determination unit 20 determines the bubble candidate region not to be a bubble region.

Figure 3:
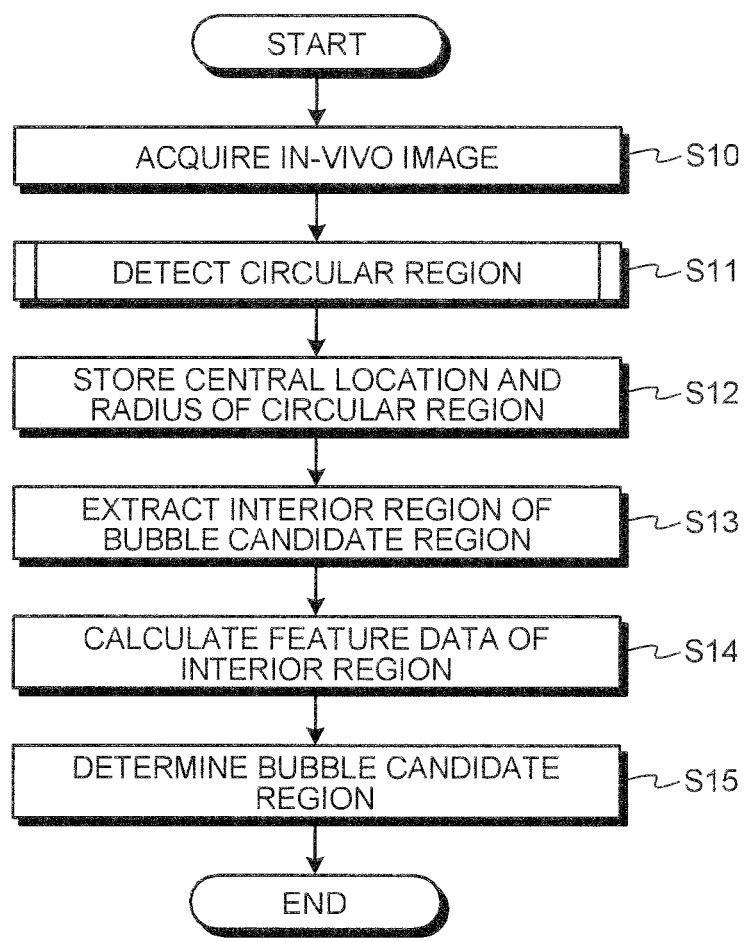
FIG. 3 is a flowchart illustrating operation of the image processing apparatus illustrated in FIG. 1.
Figure 4:
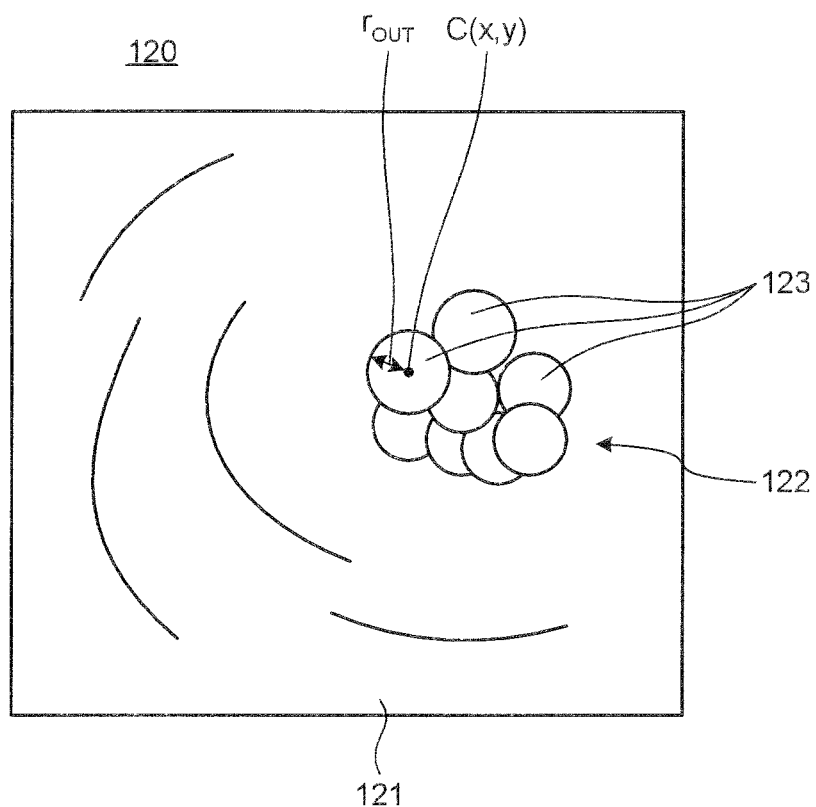
FIG. 4 is a schematic diagram illustrating an example of an in-vivo image.

Next, operation of the image processing apparatus 1 is described. FIG. 3 is a flowchart illustrating the operation of the image processing apparatus illustrated in FIG. 1. Additionally, FIG. 4 is a schematic diagram illustrating an example of an in-vivo image to be processed by the image processing apparatus 1, the in-vivo image having been captured by a capsule endoscope. As illustrated in FIG. 4, in some cases of an in-vivo image 120, an image of a region 122 having a feature different from that of a mucous membrane of a living organism is captured in a manner overlapping a mucous membrane region 121.

First, in step S10, the image acquisition unit 11 accepts input of a group of in-vivo images from the outside, and stores the in-vivo images in the storage unit 14. The arithmetic operation unit 15 reads from the storage unit 14, and acquires, the in-vivo image 120 to be processed.

In step S11, the circular region detecting unit 161 detects a circular region 123 from within the in-vivo image 120. The circular region 123 detected here not only may be a region having a completely circular shape but also may be a region having an arc-like shape, which is a shape without a part of the circumference of a circle. Note that the details of detection of a circular region are described later.

In step S12, the bubble candidate region setting unit 16 stores in the storage unit 14 the coordinates C (x,y) of the central location and the radius $r_{OUT}$ of the detected circular region 123 as information that represents a bubble candidate region. The circular region 123 is thereby set as a bubble candidate region.

Figure 5:
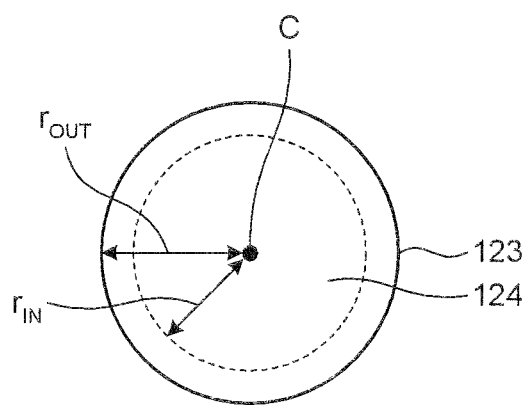
FIG. 5 is a view illustrating a method for extracting an interior region inside a bubble candidate region.

In step S13, the interior region extraction unit 18 extracts an interior region from each of the bubble candidate regions 123. Specifically, as illustrated in FIG. 5, a concentric circle having a radius smaller than that of the bubble candidate region 123 is calculated by use of formula (1) shown below.

$$r_{IN} = r_{OUT} \times K \quad (1)$$

In formula (1), $r_{IN}$ denotes the radius of the concentric circle, and K denotes a predetermined coefficient (0.0<K<1.0).

The interior region extraction unit 18 extracts a region contained in the concentric circle having the radius $r_{IN}$ as an interior region 124.

In subsequent step S14, the interior region feature-data calculation unit 19 calculates the variance of pixel values in the interior region 124 extracted from each of the bubble candidate regions 123. The value of this variation is used as texture feature data.

In step S15, the determination unit 20 compares the texture feature data with a predetermined threshold, thereby determining whether the bubble candidate region is a bubble region.

Next, detection (step S11) of a circular region is described in detail. FIG. 6 is a flowchart illustrating operation of the circular region detecting unit 161.

First, in step S101, the circular region detecting unit 161 calculates the gradient magnitude of a pixel value in each of the pixels of the in-vivo image 120 (reference: CG-ARTS Society, "Digital Image Processing", pp. 114-121) Specifically, filtering with a first derivative filter such as a Sobel filter, or a second derivative filter such as a Laplacian filter is applied to each of the pixels.

In subsequent step S102, the circular region detecting unit 161 extracts, as an edge, the positions of pixels that have the gradient magnitudes not less than a predetermined threshold or more.

In step S103, the circular region detecting unit 161 applies plural bubble models (templates), previously produced, to the positions of the respective pixels in the in-vivo image 120, and calculates a correlation value between the extracted edge and each of the bubble models. Any method capable of measuring correlation, such as the NCC (normalized cross-correlation) similarity, the SSD dissimilarity or the SAD dissimilarity, may be used as a method for calculating the correlation values (reference: CG-ARTS Society, "Digital Image Processing", pp. 203-204).

In step S104, the circular region detecting unit 161 stores, in the storage unit 14, the radius $r_{MODEL}$ of one of the bubble models that gives the largest correlation value (that is greatest in similarity or smallest in dissimilarity) with respect to each of the positions of the respective pixels.

In step S105, the circular region detecting unit 161 extracts the positions, of the respective pixels, that have the largest correlation values being not less than a predetermined threshold (or the smallest values being not more than a threshold in the case of dissimilarity). Further, the circular region detecting unit 161 outputs the extracted pixel positions C of the pixel, and the radius $r_{MODEL}$ of the bubble model that gives the largest correlation value with each of the pixel positions C, as the coordinates C (x,y) of the central position of a circular region, and as the radius $r_{OUT}$ thereof.

Note that, in place of steps S101 and S102 described above, the edge (outline) detection may be performed by use of a known technique such as the edge detection algorithm of Canny (CG-Arts Society, "Digital Image Processing", pp, 208-210). Additionally, a circular region may be detected by any one of a variety of known techniques as well as the above described technique for calculating correlation values with the bubble models.

As described above, according to the first embodiment, with respect to a circular or arc-like bubble candidate region detected by use of the bubble models, whether the bubble candidate region is a bubble region is determined on the basis of the feature data of the interior region of this bubble candidate region. Consequently, it is made possible to decrease the chance of erroneous detection of a bubble region as compared to a case where a bubble region is detected only by use of bubble models. Also, according to the first embodiment, the execution of the later steps of determining a bubble region makes it possible to set the threshold to a low value in the steps of detecting a circular region by use of bubble models. Thus, it is made possible to decrease the chance of omitting detection of a bubble region. Further, according to the first embodiment, the number of bubble models to be used can be made smaller than in a case where a bubble region is detected only by use of bubble models. In this case, it is made possible to make the total number of arithmetic operations smaller while maintaining or improving accuracy in detecting bubble regions.

Second Embodiment

Next, a second embodiment of the present invention is described. As illustrated in FIG. 7, an image processing apparatus 2 according to the second embodiment comprises an arithmetic operation unit 21. The other parts of the configuration thereof are the same as those illustrated in FIG. 1.

The arithmetic operation unit 21 comprises the bubble candidate region setting unit 16 and a bubble region determination unit 22. The configuration and operation of the bubble candidate region setting unit 16 of these units are the same as those described in the first embodiment. The bubble region determination unit 22 determines, on the basis of information belonging to the bubble candidate region, whether a bubble candidate region set by the bubble candidate region setting unit 16 is a bubble region. In the second embodiment, the information used in the determination is different from that in the first embodiment.

The bubble region determination unit 22 comprises: an interior region extraction unit 23 which extracts the interior region from within the bubble candidate region; an interior region feature-data calculation unit 24 which calculates the feature data of the interior region on the basis of the pixel values of high luminance regions existing in the inside of the interior region; and a determination unit 25 which determines, on the basis of the feature data in the high luminance regions, whether the bubble candidate region is a bubble region.

The interior region extraction unit 23 includes: a luminance value calculation unit 231 which calculates luminance values of the pixels in the bubble candidate region; and a bubble candidate region division unit 232 which divides the bubble candidate region into a boundary region and an interior region on the basis of these luminance values.

The interior region feature-data calculation unit 24 includes: a high luminance region extraction unit 241 which extracts high luminance regions existing in the inside of the interior region; and a high-luminance region feature-data calculation unit 242 which calculates the feature data of the extracted high luminance regions.

Next, operation of the image processing apparatus 2 is described. The entire operation of the image processing apparatus 2 is the same as the operation illustrated in FIG. 3, and details of the operation in steps S13 to S15 are different from those in the first embodiment.

Figure 10:
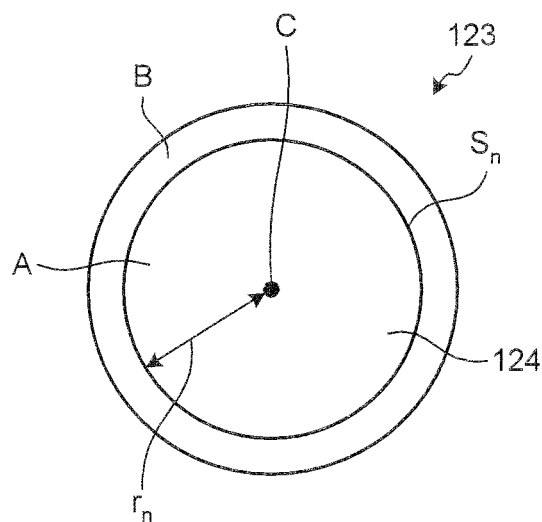
FIG. 10 is another view illustrating the method for extracting the interior region inside the bubble candidate region.

First, extraction (step S13) of the interior region of a bubble candidate region is described. FIG. 8 is a flowchart illustrating operation of the interior region extraction unit 23. Additionally, FIGS. 9 and 10 are views illustrating a method for extracting the interior region of a bubble candidate region.

First, in step S201, luminance value calculation unit 231 calculates a luminance value Y from the R value (R), G value (G) and B value (B) of each of the pixels contained in the bubble candidate region 123 and by using formula (2) shown below (reference: CG-ARTS Society, "Digital Image Processing", p. 299).

$$Y=0.3 \times R+0.59 \times G+0.11 \times B \tag{2}$$

In step S202, the bubble candidate region division unit 232 acquires plural concentric circles $S_n$ (n=1, 2, . . . ) that have radiuses smaller than that of the bubble candidate region 123 (FIG. 9). Here, when the size of one pixel in an in-vivo image is denoted as δ, the radius $r_n$ of each of the concentric circles is in the range indicated by $r_{OUT}-\delta) \geq rn \geq \delta$.

In step S203, the bubble candidate region division unit 232 calculates the means of luminance values Y in a region (inner region) A contained in one of the concentric circles $S_n$ and in a region (outer region) B in the bubble candidate region 123 that is not contained in the above concentric circle $S_n$, respectively (FIG. 10). Here, while the mean of luminance in the inner region A is denoted as $Y_A$, the mean of luminance in the outer region B is denotes as $Y_B$.

In step S204, a difference in luminance value between the inner region A and the outer region B, $\Delta Y=Y_A-Y_B$, is calculated for the bubble candidate region 123. The bubble candidate region division unit 232 calculates such difference ΔY in luminance value with respect to each of the concentric circles $S_1, S_2, \ldots$ acquired in step S202.

When, as described above, the differences ΔY in luminance value between inner parts and outer parts of the respective concentric circles $S_n$ are calculated while changing the radius $r_n$, the largest difference ΔY in luminance value is obtained for one of the concentric circles $S_n$, on condition that the circumference of this concentric circle substantially agrees with a boundary (refer to FIG. 2) between the interior region 112 and the boundary region 111 of the bubble region. Consequently, the bubble candidate region division unit 232 extracts, as the interior region 124, the inner region A corresponding to the largest difference ΔY in luminance value (step S205).

Figure 11:
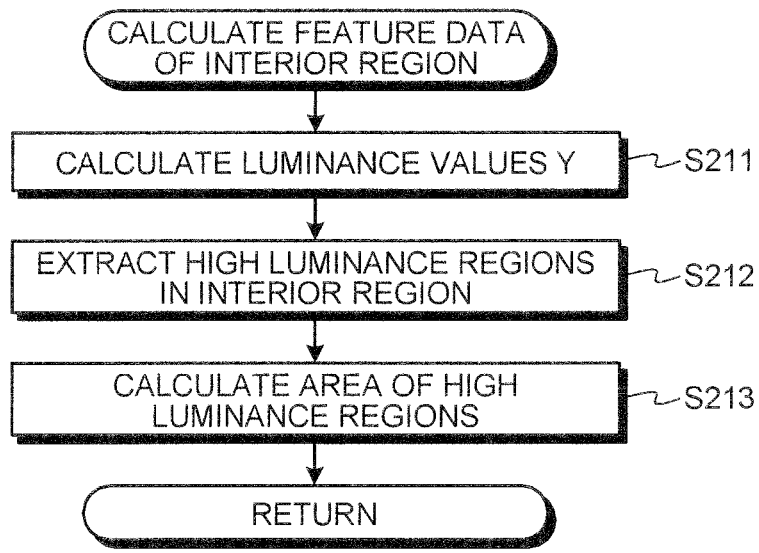
FIG. 11 is a flowchart illustrating operation of an interior region feature-data calculation unit illustrated in FIG. 7.

Next, calculation of the feature data of the interior region (step S14) is described. FIG. 11 is a flowchart illustrating operation of the interior region feature-data calculation unit 24.

Here, as illustrated in FIG. 2, regions (the high luminance regions 113) where a halation has occurred by the glare of a light source are found in part of the interior region 112. Such a region is characterized by having very high luminance. Thus, determination as to whether the candidate bubble region is a bubble region is enabled by determining whether high luminance regions exist in the interior region 112.

First, in step S211, the high luminance region extraction unit 241 calculates the luminance value Y of each pixel contained in the interior region 124 by using the above formula (2). Note that, in this step, the value calculated in step S201 of FIG. 8 may be utilized.

Subsequently, in step S212, the high luminance region extraction unit 241 extracts pixels that have the luminance values Y not less than a predetermined threshold, thereby extracting high luminance regions existing in the inside of the interior region 124.

Further, in step S213, the high-luminance region feature-data calculation unit 242 calculates the area (or the number of pixels) of the extracted region. The thus calculated area (number of pixels) is used as the texture feature data.

Next, determination (step S15) of a bubble candidate region is described.

When any high luminance region is detected from within the inside of the interior region 124, it is necessary to determine whether the luminance value thereof is attributable to halation or attributable to noise. Here, in a case where occurrence of the high luminance region is attributable to halation, the high luminance region has an area of a certain size (refer to FIG. 2). Consequently, when the area of a region extracted as the high luminance region is not less than a predetermined threshold, the determination unit 25 determines that the region is a high luminance region attributable to halation, and that the bubble candidate region in this case is a bubble region. On the other hand, when the area of a region extracted as the high luminance region is less than the predetermined threshold, the determination unit 25 determines that the luminance value of the region is noise, and that the bubble candidate region in this case is not a bubble region.

As described above, according to the second embodiment, it is made possible to, by using the luminance values of pixels contained in the bubble candidate region, extract an interior region that corresponds more precisely to an internal structure that this bubble candidate region should have when this bubble candidate region is a bubble region. Thus, further improvement of the accuracy in determining a bubble region is enabled.

Variations

A region with halation that is found in the inside of the interior region of the bubble region is characterized by having a high luminance and being white. Thus, the color feature data of the high luminance region detected from the inside of the interior region 124 may be calculated as the feature data of the interior region. Specifically, the high-luminance region feature-data calculation unit 242 acquires the R values, G values and B values of pixels extracted as the high luminance region, and then calculates means (mean R value, mean G value and mean B value) for the respective color components. Additionally, in this case, data that represents a color range of halation having occurred in vivo is previously prepared, and stored in the storage unit 14 as teacher data to be consulted when the determination is made. When the above color range includes the mean R value, mean G value and mean B value, the determination unit 25 determines that the high luminance region extracted from the bubble candidate region is attributable to halation, and that the bubble candidate region is a bubble region. On the other hand, when the above color range does not include the mean R value, mean G value and mean B value, the determination unit 25 determines that the high luminance region extracted from the bubble candidate region is noise, and that the bubble candidate region is not a bubble region.

Alternatively, when a high luminance region detected from the inside of the interior region 124 has an area (or the number of pixels) not less than a predetermined threshold, and the color range of halation includes the color feature data of this high luminance region, the determination unit 25 may determine the bubble candidate region to be a bubble region.

Third Embodiment

Figure 12:
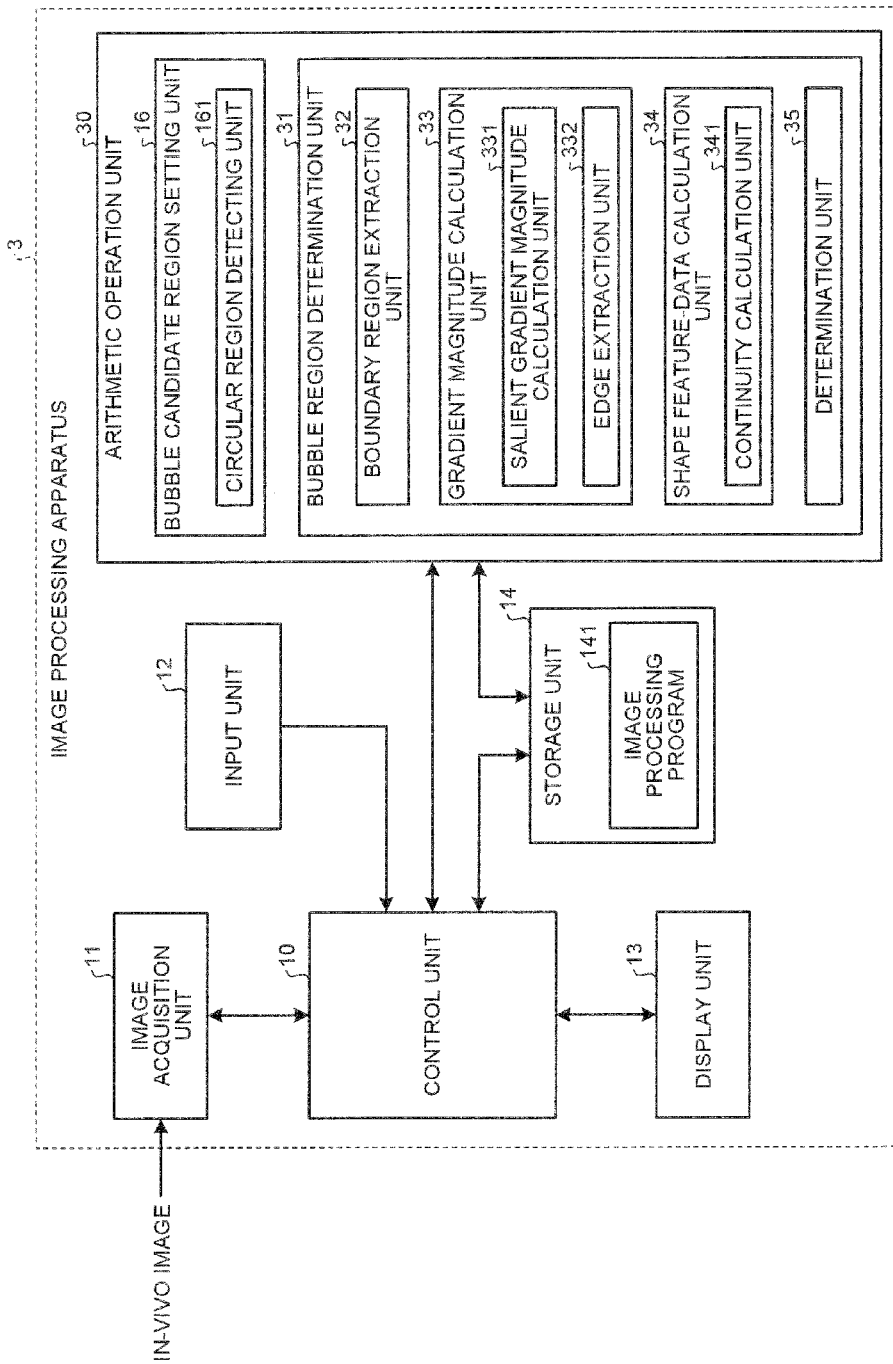
FIG. 12 is a block diagram illustrating the configuration of an image processing apparatus according to a third embodiment of the present invention.

Next, a third embodiment of the present invention is described. As illustrated in FIG. 12, an image processing apparatus 3 according to the third embodiment comprises an arithmetic operation unit 30. The other parts of the configuration thereof are the same as those illustrated in FIG. 1.

The arithmetic operation unit 30 comprises the bubble candidate region setting unit 16 and a bubble region determination unit 31. The bubble region determination unit 31 uses information on the boundary region of the bubble candidate region 123 in determining whether the bubble candidate region 123 (FIG. 4), which has been set by the bubble candidate region setting unit 16, is a bubble region.

The bubble region determination unit 31 comprises a boundary region extraction unit 32, a gradient magnitude calculation unit 33, a shape feature data calculation unit 34 and a determination unit 35.

The boundary region extraction unit 32 extracts a predetermined region in the neighborhood of the boundary of the bubble candidate region 123, and sets this predetermined region as a boundary region.

The gradient magnitude calculation unit 33 calculates, as gradient information of a boundary region 127, the gradient magnitudes of pixel values in pixels contained in the boundary region 127. More specifically, the gradient magnitude calculation unit 33 includes: a salient gradient magnitude calculation unit 331 which calculates a gradient magnitude that follows a direction along which a gradient of the pixel values is salient; and an edge extraction unit 332 which extracts an edge on the basis of the calculated gradient magnitude. Here, such an edge is extracted for the following reason. That is, it is usually the case that, in the bubble region 110 (FIG. 2), the peak of the pixel values appears in the circumferential direction inside the boundary region 111 since the pixel values in the boundary region 111 are larger than the pixel values in the interior region 112 and outside the bubble region 110. Thus, the reason is that detection of a salient gradient from the boundary region set in the bubble candidate region 123 makes it possible to extract an edge that is highly likely to be the boundary region of the bubble region, the concave gradient indicating the existence of the peak of the pixel values.

The shape feature data calculation unit 34 calculates feature data that represents shape information of the boundary of the bubble candidate region 123. More specifically, the shape feature data calculation unit 34 has a continuity calculation unit 341 to calculate, as the feature data, an evaluation value that represents continuity across gradient magnitudes in the boundary region 127.

The determination unit 35 determines, on the basis of the feature data that represents the shape information of the boundary of the bubble candidate region 123, whether the bubble candidate region 123 is a bubble region. Here, as described above, the surface tension influences the bubble region 110, so that the boundary thereof is shaped like a circle, or an arc which is a partly broken circle. Thus, the determination unit 35 determines, on the basis of the above feature data, whether the edge extracted from the boundary region 127 in the bubble candidate region 123 geometrically has a circular or arc-like shape. Then, when the edge has a circular or arc-like shape, the determination unit 35 determines that the bubble candidate region 123 is a bubble region.

Figure 13:
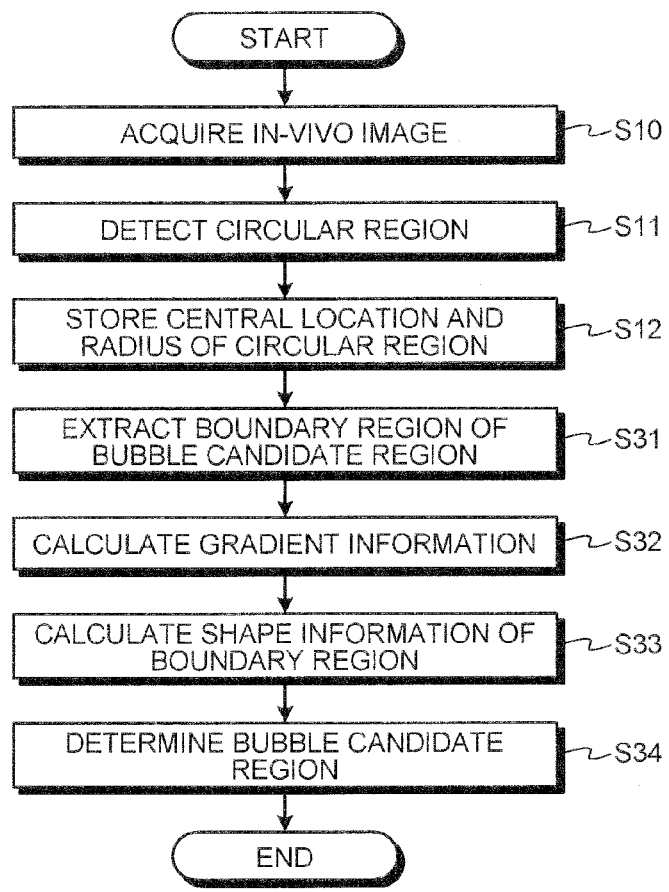
FIG. 13 is a flowchart illustrating operation of the image processing apparatus illustrated in FIG. 12.

Next, operation of the image processing apparatus 3 is described. FIG. 13 is a flowchart illustrating the operation of the image processing apparatus 3. Note that, out of steps illustrated in FIG. 13, steps S10 to S12 are the same as those described in the first embodiment.

Figure 14:
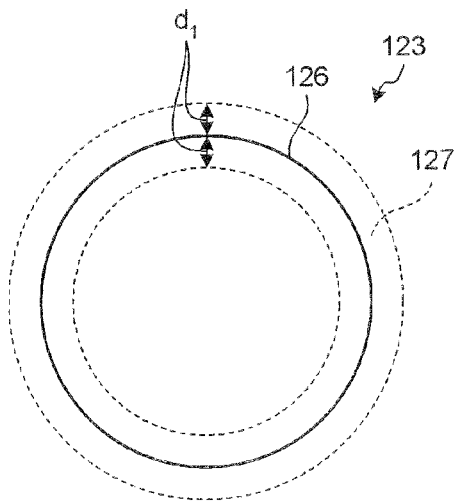
FIG. 14 is a view illustrating a method for setting a boundary region.

In step S31, the boundary region extraction unit 32 extracts a region in a range within a distance $d_1$ from a circumference 126 of the bubble candidate region 123, and sets this region as the boundary region 127, for example as illustrated in FIG. 14. Further, the boundary region extraction unit 32 counts the number N of pixels contained in the boundary region 127.

Figure 15:
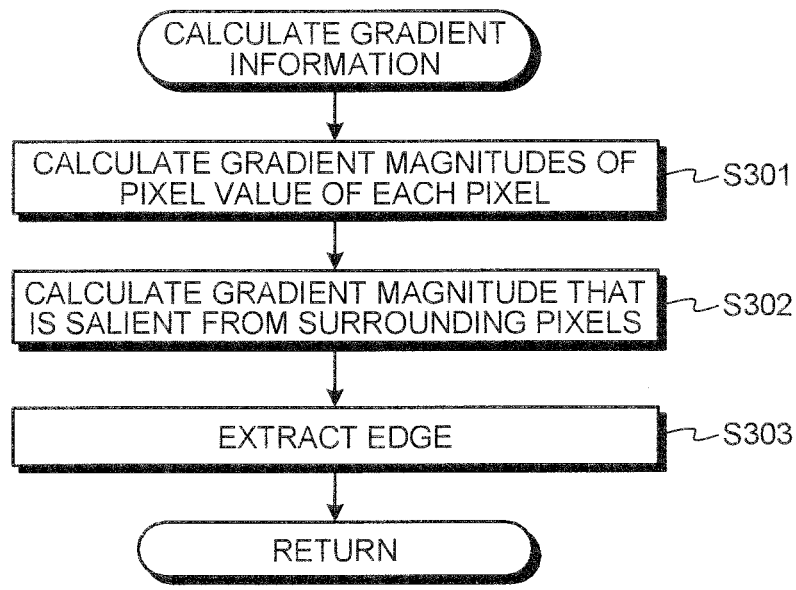
FIG. 15 is a flowchart illustrating operation of a gradient magnitude calculation unit illustrated in FIG. 12.

In step S32, the gradient magnitude calculation unit 33 calculates gradient information of the boundary region 127. FIG. 15 is a flowchart illustrating details of operation of the gradient magnitude calculation unit 33.

Figure 16:
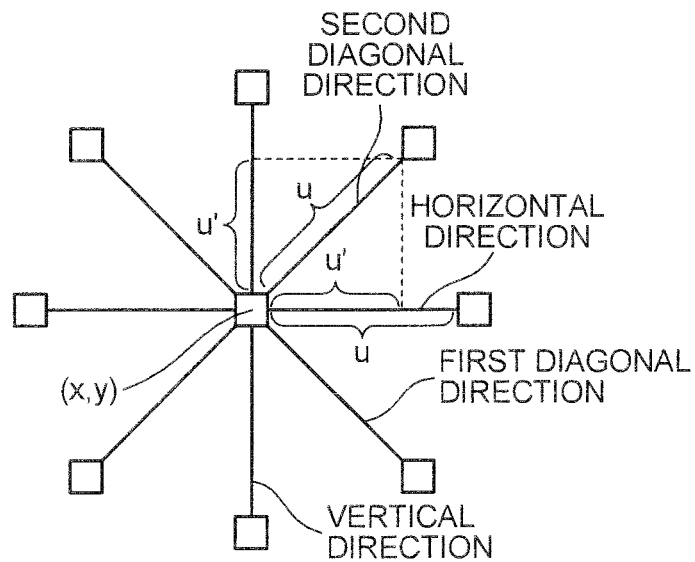
FIG. 16 is a view illustrating a method for calculating gradient information on the boundary region.

First, in step S301, the salient gradient magnitude calculation unit 331 calculates a gradient magnitude of a pixel value in each of the pixels contained in the boundary region 127. As a technique for calculating a gradient magnitude, any one of a variety of known techniques including a first derivative (such as a Sobel filter) and a second derivative may be used. For example, in a case where a second derivative is used, the salient gradient magnitude calculation unit 331 applies formulae (3) to (6) shown below to the pixel value P (x,y) of a pixel located at coordinates (x,y), thereby calculating a second derivative dH in the horizontal direction, a second derivative dV in the vertical direction, a second derivative dD1 in a first diagonal direction, and a second derivative dD2 in a second diagonal direction, as illustrated in FIG. 16.

$$dH(x, y) = P(x, y) - \frac{1}{2} \times (P(x-u, y) + P(x+u, y)) \quad (3)$$

$$dV(x, y) = P(x, y) - \frac{1}{2} \times (P(x, y-u) + P(x, y+u)) \quad (4)$$

$$dD1(x, y) = P(x, y) - \frac{1}{2} \times (P(x-u', y+u') + P(x+u', y-u')) \quad (5)$$

$$dD2(x, y) = P(x, y) - \frac{1}{2} \times (P(x-u', y-u') + P(x+u', y+u')) \quad (6)$$

Here, the parameter u is an integer, and the parameter u' is an integer obtained by rounding off (u/√2). These parameters u and u' indicate the range of pixels at the time of calculating the second derivatives. That is, accuracy of gradient components can be adjusted by setting the parameter u to a desired value. For example, a gradient component that has a high spatial frequency can be calculated when the value of the parameter u is set small, whereas a gradient component that has a low spatial frequency can be calculated when the value of the parameter u is set large. As the value for the parameter u, a fixed value may be set previously, or a dynamic value may be set in accordance with the characteristic of in-vivo images. Alternatively, the processing may be performed by providing from the outside the parameter u set to a desired value.

In step S302 that follows, the salient gradient magnitude calculation unit 331 uses the next formula (7) to extract the maximum of positive values out of the second derivatives dH, dV, dD1 and dD2 calculated with respect to the different directions, thereby calculating a gradient magnitude (salient gradient magnitude), $g_{conv}$ (x,y), in a direction along which the gradient rises (i.e., the gradient is salient against the neighboring pixels).

$$g_{conv}(x,y) = \max(0, dH(x,y), dV(x,y), dD1(x,y), dD2(x,y)) \quad (7)$$

Here, as illustrated in FIG. 2, in the case of the bubble region 110, the peak of the pixel values inside the boundary region 111 appears along the diametrical direction since the pixel values in the boundary region 111 are larger than the pixel values in the interior region 112 and outside the bubble region 110. Consequently, a rise in pixel values along the diametrical direction can be detected by calculating the salient gradient magnitude $g_{conv}$.

Figure 17:
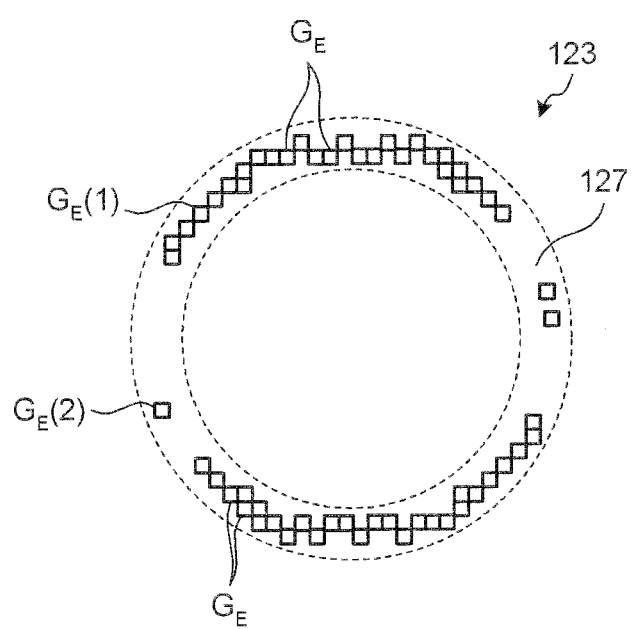
FIG. 17 is a view illustrating a method for calculating feature data that represents continuity of an arc in the boundary region.

Further, in step S303, the edge extraction unit 332 binarizes, by using a predetermined threshold, the salient gradient magnitudes $g_{conv}$ (x,y) calculated with respect to each of the pixels, thereby extracting edge pixels. FIG. 17 illustrates edge pixels $G_E$ thus extracted from the boundary region 127.

In step S33, the shape feature data calculation unit 34 calculates, as the feature data for the shape information of the boundary region 127, an evaluation value that represents the continuity of an arc.

Specifically, first, the continuity calculation unit 341 acquires the number $N_{EDG1}$ (i.e., one equivalent to the area of the edges) of the edge pixels $G_E$ extracted in the boundary region 127.

Subsequently, the continuity calculation unit 341 determines whether an edge pixel adjacent to each of the edge pixels $G_E$ exists along any one of the eight directions around the edge pixel $G_E$. Then, the continuity calculation unit 341 counts the number $N_{EDG2}$ of the edge pixels $G_E$ that have edge pixels adjacent thereto. For example, the edge pixel $G_E$ (1) illustrated in FIG. 17 is counted because an edge pixel adjacent thereto exists along a direction obliquely upward and rightward therefrom. On the other hand, the edge pixel $G_E$ (2) is not counted because an edge pixel adjacent thereto does not exist along any one of the eight directions around the edge pixel $G_E$ (2).

The continuity calculation unit 341 uses these values $N_{EDG1}$ and $N_{EDG2}$ to calculate an evaluation value $E_{CON}$ that is given by formula (8) shown below.

$$E_{CON} = (N_{EDG1} \times (1-k) + N_{EDG2} \times k)/N \quad (8)$$

Here, N denotes the number of all the pixels contained in the boundary region 127, and is used to normalize the evaluation values on the basis of the size of the bubble candidate region 123. Additionally, k (0<k<1) is a coefficient (constant) used for weighting an edge pixel that continues from another one of the edge pixels.

In step S34, the determination unit 35 determines the bubble candidate region 123 by comparing an evaluation value $E_{CON}$, with a predetermined threshold. That is, when the evaluation value $E_{CON}$ is not less than a threshold, the continuity across the edge pixels $G_E$ is high, and, in this case, the bubble candidate region 123 is determined to be a bubble region. On the other hand, when the evaluation value $E_{CON}$ is less than a predetermined threshold, the continuity of edge pixels $G_E$ is low, and, in this case, it is determined that the bubble candidate region 123 is not a bubble region.

As described above, according to the third embodiment, the bubble candidate region is determined on the basis of the shape information of the boundary region of the bubble candidate region, whereby the determination can be accurately made with a small amount of arithmetic operations.

Variation 3-1

The continuity calculation unit 341 may calculate, as an evaluation value indicating continuity of an arc, by using gradient magnitudes of the edge pixels $G_E$ instead of the numbers $N_{EDG1}$ and $N_{EDG2}$ of the edge pixels $G_E$. Specifically, the continuity calculation unit 341 calculates the sum $SUM_{EDG1}$ of the maximum gradient magnitudes $g_{conv}$ of the edge pixels $G_E$ extracted by the boundary region 127. Further, after detecting the edge pixels $G_E$ around each of which an edge pixel adjacent thereto exists along any one of the eight directions around the edge pixel $G_E$, the continuity calculation unit 341 calculates the sum $SUM_{EDG2}$ of the maximum gradient magnitudes of the thus detected edge pixels $G_E$. Then, the continuity calculation unit 341 uses the sums $SUM_{EDG1}$ and $SUM_{EDG2}$ to calculate an evaluation value $E_{CON}'$ to be given by formula (9) shown below.

$$E_{CON}'=(SUM_{EDG1}\times(1-k)+SUM_{EDG2}\times k)/(N\times g_{MAX}), \quad (9)$$

where $g_{MAX}$ denotes the maximum of gradient magnitudes that can be taken by the edge pixels $G_E$ (for example, 255).

The higher the gradients of edge pixels that are adjacent to each other, the larger this evaluation value $E_{CON}'$, indicating that the continuity across the edge pixel $G_E$ forming an arc is higher.

Variation 3-2

Figure 18:
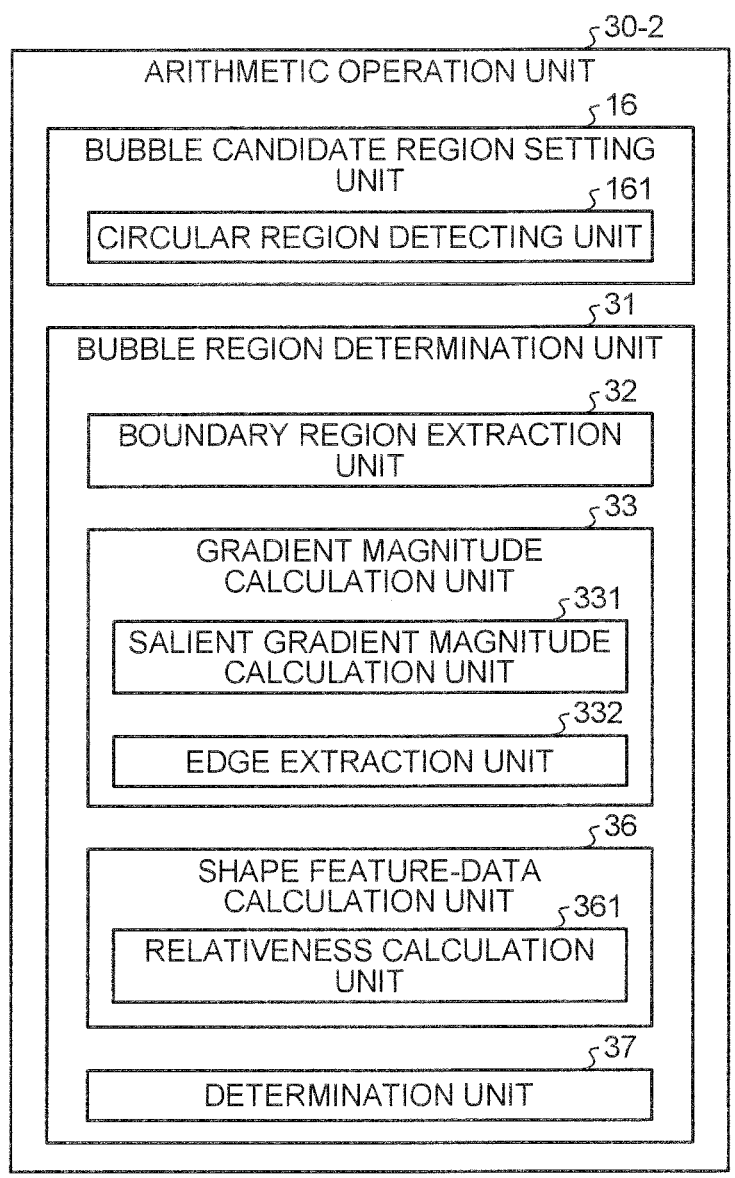
FIG. 18 is a block diagram illustrating the configuration of an arithmetic operation unit of an image processing apparatus according to Variation 3-2.

FIG. 18 is block diagram illustrating the configuration of an arithmetic operation unit 30-2 of an image processing apparatus according to Variation 3-2. In this arithmetic operation unit 30-2, the shape feature-data calculation unit 36 comprises an relativeness calculation unit 361 which calculates, as feature data that represents shape information of the boundary of the bubble candidate region 123, an evaluation value that represents the relativeness about the central coordinates of the bubble candidate region 123 among the edge pixels $G_E$ extracted from the boundary region 127.

Here, an edge indicating the boundary of the bubble region usually appears at positions opposite to each other about the central coordinate of a circular. Therefore, when the relativeness of the edge pixels $G_E$ in the boundary region 127 is high, it can be determined that these edge pixels $G_E$ constitutes the boundary of the bubble region. Here, high relativeness means that there are a large number of pairs of edge pixels, the pairs each consisting of two edge pixels exist at positions opposed to each other about the central coordinates of a circle.

Figure 19:
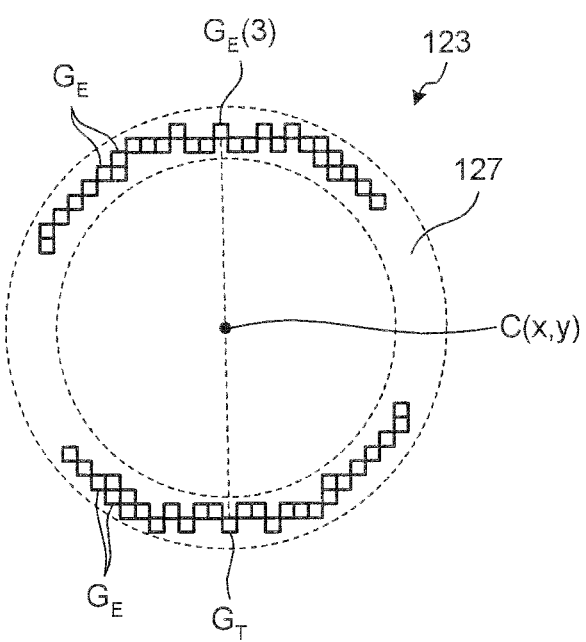
FIG. 19 is a view illustrating a method for calculating an evaluation value that represents relativeness across edge pixels in the boundary region about the central coordinates of the bubble candidate region.

In determining the bubble candidate region 123, first, the relativeness calculation unit 361 counts the number $N_{EDG1}$ of the edge pixels $G_E$ extracted from the boundary region 127, as illustrated in FIG. 19. Additionally, in the boundary region 127, the relativeness calculation unit 361 extracts, and counts the number $N_{EDG3}$ of, the edge pixels $G_E$ each of which is opposed to another edge pixel about the central coordinates C (x,y) of the bubble candidate region 123. For example, the edge pixel $G_E$ (3) illustrated in FIG. 19 is counted because another edge pixel $G_T$ exists on a diameter of the bubble candidate region 123, the diameter passing through the edge pixel $G_E$. Using these values $N_{EDG1}$ and $N_{EDGE3}$, the relativeness calculation unit 361 calculates an evaluation value $E_{REL}$ that is given by formula (10) shown below.

$$E_{REL}=(N_{EDG1}\times(1-k)+N_{EDG3}\times k)/N \quad (10)$$

In this case, a determination unit 37 determines the bubble candidate region 123 by comparing the evaluation value $E_{REL}$ with a predetermined threshold. That is, when the evaluation value $E_{REL}$ is not less than the threshold, the determination unit 37 determines that the relativeness among the edge pixels $G_E$ is high, and that the bubble candidate region 123 is therefore a bubble region. On the other hand, when the evaluation value $E_{REL}$ is less than the threshold, the determination unit 37 determines that the relativeness among the edge pixels $G_E$ is low, and that the bubble candidate region 123 is therefore not a bubble region.

Alternatively, the relativeness calculation unit 361 may, as in the case of Variation 3-1, use gradient magnitudes to calculate an evaluation value that represents relativeness. That is, the relativeness calculation unit 36 calculates the sum $SUM_{EDG1}$ of the largest gradient magnitudes $g_{conv}$ of the edge pixels $G_E$ extracted from the boundary region 127, and the sum $SUM_{EDG3}$ of the largest gradient magnitudes $g_{conv}$ of the edge pixels $G_E$ each of which is opposed to another edge pixel $G_T$ about the central coordinates C (x,y) of the bubble candidate region 123. Then, the relativeness calculation unit 36 calculates an evaluation value $E_{REL}'$ that is given by formula (11) shown below.

$$E_{REL}'=(SUM_{EDG1}\times(1-k)+SUM_{EDG3}\times k)/(N\times g_{MAX}) \quad (11)$$

The higher the gradients of edge pixels located at positions opposed to each other, the larger this evaluation value $E_{REL}'$, indicating that the relativeness among the edge pixel $G_E$ is higher.

Variation 3-3

Figure 20:
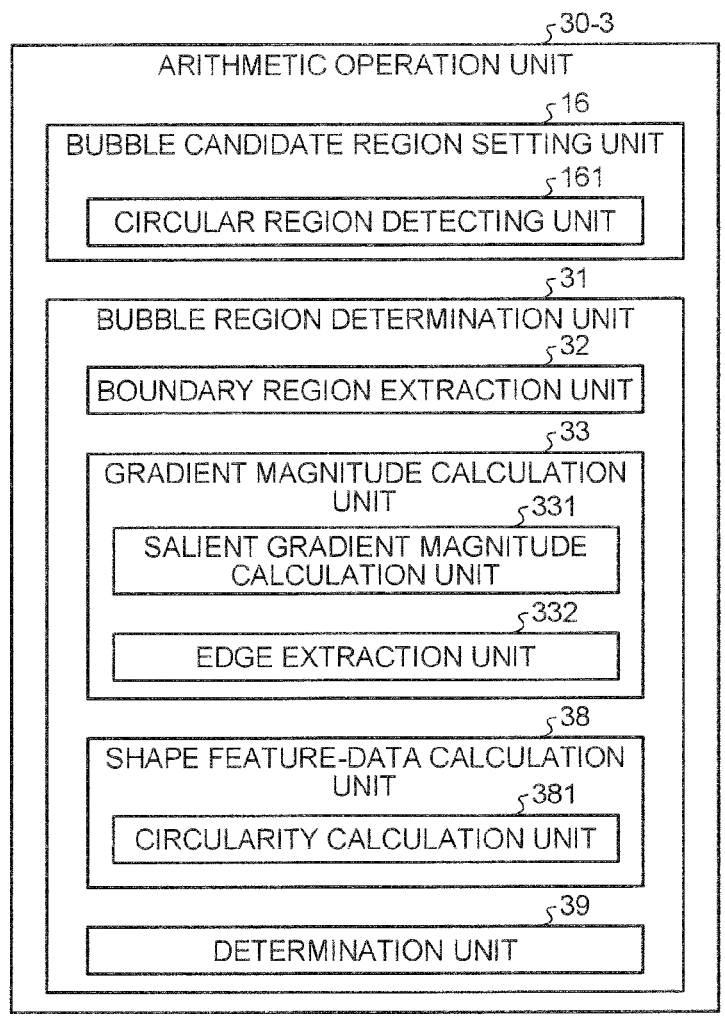
FIG. 20 is a block diagram illustrating the configuration of an arithmetic operation unit of an image processing apparatus according to Variation 3-3.

FIG. 20 is a block diagram illustrating the configuration of an arithmetic operation unit 30-3 of an image processing apparatus according to Variation 3-3. In this arithmetic operation unit 30-3, a shape feature data calculation unit 38 comprises a circularity calculation unit 381 which calculates, as a feature data that represents shape information of the boundary of the bubble candidate region 123, an evaluation value that represents the circularity, that is, the geometrical similarity to a circle, of the edge pixels in the boundary region 127.

Figure 21:
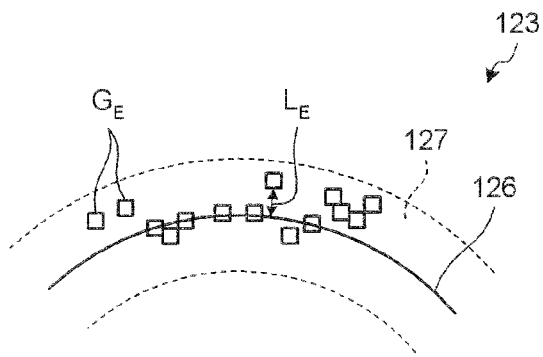
FIG. 21 is a view illustrating a method for calculating an evaluation value that represents circularity formed by edge pixels in a boundary region.

FIG. 21 is a schematic view illustrating a part of the boundary region 127 of the bubble candidate region 123. In determining the bubble candidate region 123, first, the circularity calculation unit 381 counts the number $N_{EDG1}$ of the edge pixels $G_E$ extracted from the boundary region 127. Additionally, the circularity calculation unit 381 calculates distances $L_E$ from the respective edge pixels $G_E$ to the circumference 126 of the bubble candidate region 123, and counts the number $N_{GC}$ of the edge pixels that correspond to the distances $L_E$ that are not more than a predetermined threshold. Using these values $N_{EDG1}$ and $N_{GC}$, the circularity calculation unit 381 calculates an evaluation value $E_{CIR}$ that is given by formula (12) shown below.

$$E_{CIR}=\{N_{EDG1}\times(1-k)+N_{GC}\times k\}/N \quad (12)$$

In formula (12), k is a coefficient (a constant) that satisfies $0<k<1$.

The more similar the shape formed by the edge pixels is to a circle, the larger value this evaluation value $E_{CIR}$ takes.

In this case, a determination unit 39 determines the bubble candidate region 123 by comparing the evaluation value $E_{CIR}$ with a predetermined threshold. That is, when the evaluation value $E_{CIR}$ is not less than the predetermined threshold, it is determined that the circularity of the edge pixels $G_E$ is high, and that the bubble candidate region 123 is a bubble region. On the other hand, when the evaluation value $E_{CIR}$ is less than the threshold, it is determined that the circularity of the edge pixels $G_E$ is low, and that the bubble candidate region 123 is not a bubble region.

Fourth Embodiment

Figure 22:
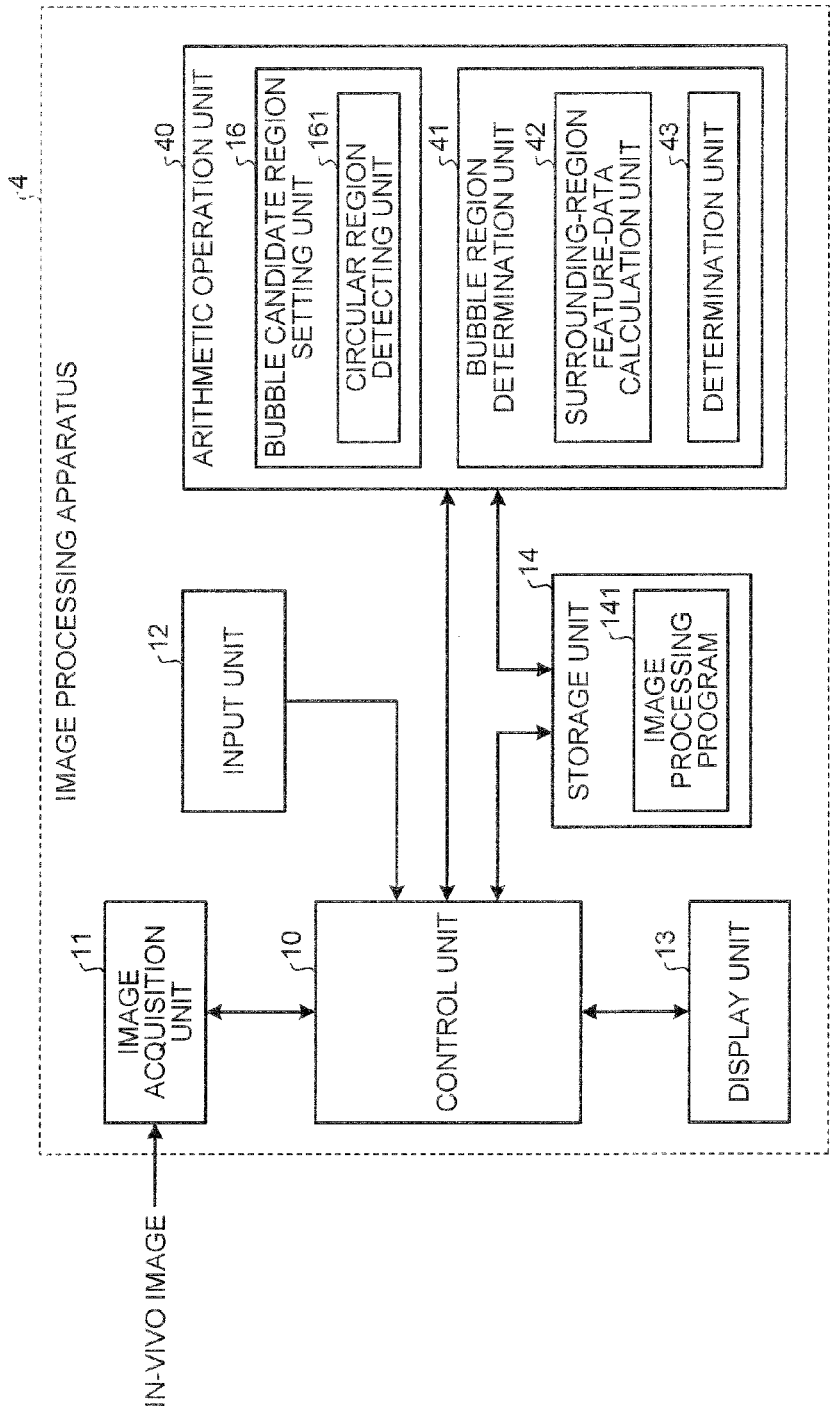
FIG. 22 is a block diagram illustrating the configuration of an image processing apparatus according to a fourth embodiment of the present invention.

Next, a fourth embodiment of the present invention is described. As illustrated in FIG. 22, an image processing apparatus 4 according to the fourth embodiment comprises an arithmetic operation unit 40. The other parts of the configuration thereof are the same as those illustrated in FIG. 1.

An arithmetic operation unit 40 comprises the bubble candidate region setting unit 16 and a bubble region determination unit 41. Using information on the surrounding region of the bubble candidate region 123, the bubble region determination unit 41 determines whether the bubble candidate region 123, which has been set by the bubble candidate region setting unit 16, is a bubble region.

The bubble region determination unit 41 has a surrounding region feature-data calculation unit 42 and a determination unit 43. The surrounding region feature-data calculation unit 42 detects another bubble candidate region (circular region) and any already determined bubble region that exists around the bubble candidate region 123, and calculates feature data which is based on this detection result. Here, bubble regions usually occur crowdedly in vivo. Therefore, in a case where a particular bubble candidate region is surrounded by a large number of other bubble candidate regions and already determined bubble regions, it is highly probable that the particular candidate region is a bubble region. Consequently, the bubble region determination unit 41 is configured to calculate the feature data of the surrounding region of the bubble candidate region 123 that should be determined.

The determination unit 43 determines, on the basis of this feature data, whether the bubble candidate region 123 is a bubble region.

Next, operation of the image processing apparatus 4 is described. FIG. 23 is a flowchart illustrating the operation of the image processing apparatus 4. Out of the steps illustrated in FIG. 23, steps S10 to S12 are the same as those described in the first embodiment.

In step S41, the surrounding region feature-data calculation unit 42 calculates a feature data with respect to the surrounding region of the bubble candidate region on the basis of determination results about bubble candidate regions and/or detection results about bubble regions. That is, from an in-vivo image 130 illustrated in FIG. 24, the surrounding region feature-data calculation unit 42 counts the number i and number j of other bubble candidate 133 and already determined bubble regions 134, respectively, that exist in a range 132 within a predetermined distance $d_2$ from the central location C (x,y) of a bubble candidate region 131 to be determined. Then, using these values i and j and formula (13) shown below, the surrounding region feature-data calculation unit 42 calculates feature data CHR, $$CHR = i \times W_1 + j \times W_2 \quad (13)$$

In formula (13), $W_1$ and $W_2$ are constants that satisfy $W_2 > W_1$, and are used for weighting the numbers i and j of the already determined bubble regions, respectively.

In subsequent step S42, the determination unit 43 determines the bubble candidate region 131 by comparing the feature data CHR with a predetermined threshold. That is, when the feature data CHR is not less than the threshold, it is determined that there are bubbles crowding around the bubble candidate region 131, and that the bubble candidate region 131 is also a bubble region in this case. On the other hand, when the feature data CHR is less than the threshold, it is determined that there are not bubbles crowding around the bubble candidate region 131, and that the bubble candidate region 131 is not a bubble region in this case.

As described above, according to the fourth embodiment, determination as to whether a region is a bubble region is made on the basis of the nature of bubbles that bubbles crowd and by use of information on the surrounding region of the bubble candidate region, whereby improvement in accuracy of the determination is made possible with a small amount of arithmetic operations as compared to a conventional bubble region detection method by which circular regions are detected by use of bubble models.

Fifth Embodiment

Figure 25:
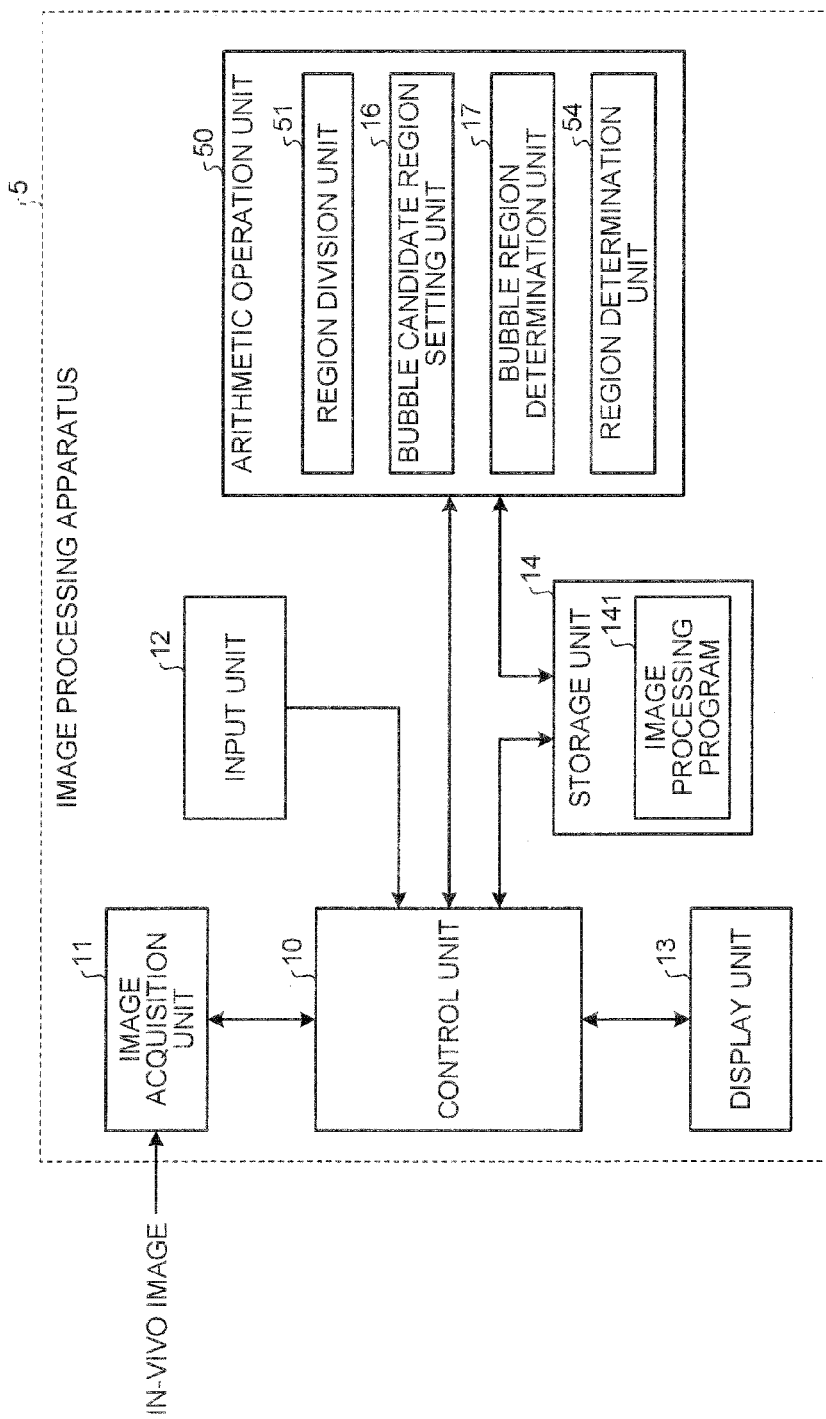
FIG. 25 is a block diagram illustrating the configuration of an image processing apparatus according to a fifth embodiment of the present invention.

Next, a fifth embodiment of the present invention is described. As illustrated in FIG. 25, an image processing apparatus 5 according to the fifth embodiment comprises an arithmetic operation unit 50. The other parts of the configuration thereof are the same as those illustrated in FIG. 1.

In addition to the bubble candidate region setting unit 16 and the bubble region determination unit 17, the arithmetic operation unit 50 further comprises: a region division unit 51 which divides in-vivo image into plural regions; and a region determination unit 54 which determines whether any bubble region exists in the whole of each of the division region. Note that the configurations and operation of the bubble candidate region setting unit 16 and the bubble region determination unit 17 are the same as those described in the first embodiment. Additionally, the arithmetic operation unit 50 may comprise any one of the bubble region determination units 22, 31 and 41 described in Embodiments 2 to 4, instead of the bubble region determination unit 17.

Here, regions in an in-vivo image that have features (features in terms of color, texture or the like) similar to each other are often of the same category (such as, for example, a mucosal region, a bubble region). Consequently, in the fifth embodiment, an in-vivo image is divided into plural regions on the basis of feature data representing color information or the like. Then, when regions that have been individually determined to be bubble regions account for a predetermined portion or more of any one of the regions obtained by the division, it is assumed that a bubble region exists in the whole of this one of the regions obtained by the division. This makes it possible to detect even a bubble region that has not been able to be detected individually.

FIG. 26 is a flowchart illustrating operation of the image processing apparatus 5.

First, in step S10, the image processing apparatus 5 acquires an in-vivo image. Note that details of this step are the same as those described in the first embodiment.

In subsequent step S51, the region division unit 51 divides an in-vivo image 135 into plural regions 136 and 137 as illustrated in FIG. 27. As a method for the division, any one of a variety of known methods may be used. For example, a region unification method (reference: CG-ARTS Society, "Digital Image Processing", p. 196) or a K-means method being one of the clustering techniques (reference: CG-ARTS Society, "Digital Image Processing", p. 232) may be used, the region unification method being a method by which a region is divided into sets each consisting of pixels that have similar feature data (pixel values, texture feature data or the like) and are spatially close to one another.

In step S52, the bubble candidate region setting unit 16 detects circular regions from the in-vivo image 135, sets those regions as bubble candidate regions 138. Note that the same method as described in the first embodiment is employed as a method for detecting the circular regions.

In step S53, the bubble region determination unit 17 determines whether each of the bubble candidate regions 138 is a bubble region. Note that the same method as described in each of Embodiments 1 to 4 is employed as a method for determining the bubble candidate regions 138.

In step S54, the region determination unit 54 determines whether a bubble region exists in the whole of each of the division regions 136 and 137 on the basis of a result of the determination for bubble regions. That is, first, the region determination unit 54 acquires the area (or the number of pixels) $s_1$ of each of the regions obtained by the division, and the gross area (or the number of the pixels) so of regions determined to be bubble regions in each of the regions obtained by the division, and calculates a ratio (area rate) $s_2/s_1$ of the area $s_2$ of the bubble regions to the area $s_1$ of each of the division regions. When this area rate $s_2/s_1$ is not less than a predetermined threshold, it is determined that bubble regions exist throughout the whole of the division region. On the other hand, when this area rate $s_2/s_1$ is less than the predetermined threshold, it is determined that bubble regions do not exist throughout the whole of the division region. For example, in the case of the division region 136, the ratio accounted for by the regions therein determined to be bubble regions is low (zero), whereby it is determined that bubble regions do not exist throughout the whole thereof. On the other hand, in the case of the division region 135, provided that all of the bubble candidate regions are bubble regions, the ratio accounted for by bubble regions is high, whereby it is determined that bubble regions exist throughout the whole thereof in this case.

As described above, in the fifth embodiment, whether bubble regions exist throughout the whole of regions obtained by the division based on similarity in feature data is determined on the basis of a ratio accounted for by regions individually determined to be bubble regions. Therefore, it is made possible to extract, as a bubble region, even a region that has not been detected as a circular region.

Additionally, in the fifth embodiment, the amount of arithmetic operations can be reduced because it is made possible to perform arithmetic operations while limiting the sizes of bubble models to the size of each of the division regions or smaller, the bubble models being used in detecting circular regions.

Each of the image processing apparatuses according to Embodiments 1 to 5 described above can be implemented by executing, on a computer system such as a personal computer or a work station, an image processing program recorded in a recording medium. Additionally, such a computer system may be used while being connected to an apparatus such as another computer system or a server via a public line such as a local area network, a wide area network (LAN/WAN) or the Internet. In this case, each of the image processing apparatuses according to Embodiments 1 to 5 may be configured to acquire image data of in-vivo images via any one of these networks, output image processing results to various output devices (such as a viewer and a printer) connected through such networks, and store image processing results in a storage device (such as a recording medium or a reader for the recording medium) connected through such a network.

According to one aspect of the present invention, whether a candidate bubble region detected from an image by use of bubble region shape models is a bubble region is determined on the basis of information belonging to the bubble candidate region, whereby accurate detection of a bubble region is made possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus to detect a bubble region included in an image, comprising:
   a processor; and
   a memory storing computer-readable instructions that, when executed by the processor, implement:
   a bubble candidate region setting unit which sets, from the image, a region as a bubble candidate region, the region having a shape corresponding to a bubble region shape model stored in a storage unit; and
   a bubble region determination unit which determines, on the basis of information belonging to the bubble candidate region, whether the bubble candidate region is a bubble region;
   wherein the bubble candidate region setting unit comprises a circular region detecting unit which detects, from the image, a region having a circular or arc-like shape.

2. The image processing apparatus according to claim 1, wherein the bubble region determination unit performs the determination by using information belonging to a boundary region included in the periphery of the bubble candidate region or belonging to an interior region located to the inside of the boundary region.

3. The image processing apparatus according to claim 1, wherein the bubble region determination unit further comprises:
   an interior region extraction unit which extracts an interior region of the candidate bubble region;
   an interior-region feature data calculation unit which calculates feature data for the interior region; and
   a determination unit which determines, on the basis of the feature data, whether the candidate bubble region is a bubble region.

4. The image processing apparatus according to claim 3, wherein the interior region extraction unit comprises:
   a luminance value calculation unit which calculates the luminance value of each pixel contained in the bubble candidate region; and
   a bubble candidate region dividing unit which, on the basis of differences in luminance value between a plurality of regions in the candidate bubble region, divides the bubble candidate region into the plurality of regions.

5. The image processing apparatus according to claim 3, wherein the interior region feature-data calculation unit comprises a texture calculation unit which calculates texture feature data for the interior region.

6. The image processing apparatus according to claim 5, wherein the texture feature data is the variance of pixel values in the interior region.

7. The image processing apparatus according to claim 3, wherein the interior region feature calculation unit comprises:
   a high luminance region extraction unit which extracts high luminance regions that exist in the inside of the interior region; and a high-luminance region feature-data calculation unit which calculates feature data for the interior region on the basis of a result of the extraction of the high luminance regions.

8. The image processing apparatus according to claim 7, wherein the high-luminance region feature-data calculation unit calculates a color feature data for the high luminance region.

9. The image processing apparatus according to claim 1, wherein the bubble region determination unit comprises:
   a surrounding region feature-data calculation unit which detects regions existing in a predetermined range around the candidate bubble region, the regions each being another bubble candidate region or an already determined bubble region, and calculates feature data that is based on the result of the detection; and
   a determination unit which determines, on the basis of the feature data, whether the bubble candidate region is a bubble region.

10. The image processing apparatus according to claim 1, wherein the computer-readable instructions, when executed by the processor, further implement:
    a region division unit which divides the image into a plurality of regions; and
    a region determination unit which determines, on the basis of the result of the determination by the bubble region determination unit, whether each of the plurality of regions obtained by the division is a bubble region.

11. The image processing apparatus according to claim 10, wherein the region division unit divides the image on the basis of color feature data or texture feature data.

12. The image processing apparatus according to claim 1, wherein the image is an in-vivo image obtained by imaging an in-vivo lumen.

13. The image processing apparatus according to claim 1, wherein the bubble region determination unit comprises:
    a boundary region extraction unit which extracts the boundary region of the candidate bubble region;
    a gradient magnitude calculation unit which calculates the gradient magnitudes of pixel values in pixels contained in the boundary region; and
    a shape feature-data calculation unit which calculates information on the shape of a bubble candidate region on the basis of the gradient magnitude.

14. The image processing apparatus according to claim 13, wherein the gradient magnitude calculation unit comprises a salient gradient magnitude calculation unit which calculates, with respect to each pixel contained in the boundary region, a gradient magnitude in a direction along which the gradient of pixel value is salient.

15. The image processing apparatus according to claim 14, wherein the gradient magnitude calculation unit comprises an edge extraction unit which extracts an edge on the basis of the gradient magnitude.

16. The image processing apparatus according to claim 13, wherein the shape feature-data calculation unit comprises a continuity calculation unit which calculates an evaluation value that represents continuity across pixels that have predetermined gradient magnitudes of pixel values.

17. The image processing apparatus according to claim 16, wherein the continuity calculation unit detects pixels adjacent to each other that have the gradient magnitudes, and calculates the evaluation value on the basis of the number of the detected pixels or the gradient magnitudes thereof.

18. The image processing apparatus according to claim 13, wherein the shape feature-data calculation unit comprises a relativeness calculation unit which calculates an evaluation value that represents relativeness among pixels about the central coordinates of the bubble candidate region, the pixels having the predetermined gradient magnitudes of pixel values.

19. The image processing apparatus according to claim 18, wherein the relativeness calculation unit detects pixels that are located at positions opposite to each other about the central coordinates of the candidate bubble region and have the gradient magnitudes, and calculates the evaluation value on the basis of the number of the detected pixels or the gradient magnitudes thereof.

20. The image processing apparatus according to claim 13, wherein the shape feature-data calculation unit comprises a circularity calculation unit which calculates an evaluation value that represents the circularity of pixels that have the predetermined gradient magnitudes of pixel values.

21. The image processing apparatus according to claim 20, wherein the circularity calculation unit calculates the evaluation value on the basis of distances from a predetermined circumference to the pixels that have the gradient magnitudes.

22. An image processing method for detecting a bubble region in an image, comprising:
    a bubble candidate region setting in which, from the image, a region having a shape corresponding to a bubble region shape model stored in a memory is set as a bubble candidate region; and
    a bubble candidate region determining in which whether the bubble candidate region is a bubble region is determined on the basis of information belonging to the bubble candidate region;
    wherein the bubble candidate region setting comprises a circular region detecting which detects, from the image, a region having a circular or arc-like shape.

23. A computer-readable recording device with an executable program stored thereon, wherein the program instructs a processor to perform:
    a bubble candidate region setting in which, from the image, a region having a shape corresponding to a bubble region shape model stored in a memory is set as a bubble candidate region; and
    a bubble candidate region determining in which whether the bubble candidate region is a bubble region is determined on the basis of information belonging to the bubble candidate region;
    wherein the bubble candidate region setting comprises a circular region detecting which detects, from the image, a region having a circular or arc-like shape.

24. An image processing apparatus to detect a bubble region included in an image, comprising:
    a bubble candidate region setting unit which sets, from the image, a region as a bubble candidate region, the region having a shape corresponding to a bubble region shape model stored in a storage unit; and
    a bubble region determination unit which determines, on the basis of information belonging to the bubble candidate region, whether the bubble candidate region is a bubble region;
    wherein the bubble candidate region setting unit comprises a circular region detecting unit which detects, from the image, a region having a circular or arc-like shape.

* * * * *